(12) United States Patent
Bang et al.

(10) Patent No.: US 12,301,860 B2
(45) Date of Patent: *May 13, 2025

(54) MOTION INFORMATION PREDICTION METHOD AND APPARATUS FOR DISTORTION DUE TO PROJECTION FORMATION CONVERSION

(71) Applicant: ELECTRONICS AND TELECOMMUNICATIONS RESEARCH INSTITUTE, Daejeon (KR)

(72) Inventors: Gun Bang, Daejeon (KR); Hui Yong Kim, Daejeon (KR); Gwang Hoon Park, Seongnam-si (KR); Woo Woen Gwun, Jeonju-si (KR); Tae Hyun Kim, Hwaseong-si (KR); Won Jun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,911

(22) Filed: Dec. 22, 2023

(65) Prior Publication Data

US 2024/0146953 A1    May 2, 2024

Related U.S. Application Data

(63) Continuation of application No. 18/085,678, filed on Dec. 21, 2022, now Pat. No. 11,895,317, which is a
(Continued)

(30) Foreign Application Priority Data

Jan. 7, 2019   (KR) .................. 10-2019-0001726
Jan. 7, 2020   (KR) .................. 10-2020-0002240

(51) Int. Cl.
*H04N 19/517*    (2014.01)
*H04N 19/176*    (2014.01)
(Continued)

(52) U.S. Cl.
CPC ......... *H04N 19/517* (2014.11); *H04N 19/176* (2014.11); *H04N 19/182* (2014.11); *H04N 19/184* (2014.11)

(58) Field of Classification Search
CPC .. H04N 19/517; H04N 19/184; H04N 19/182; H04N 19/176; H04N 19/70; H04N 19/52
See application file for complete search history.

(56) References Cited

U.S. PATENT DOCUMENTS

2013/0215968 A1    8/2013   Jeong et al.
2014/0133559 A1    5/2014   Kim et al.
(Continued)

FOREIGN PATENT DOCUMENTS

KR    10-2010-0058201 A    6/2010
KR    10-2012-0044917 A    5/2012
(Continued)

OTHER PUBLICATIONS

Zou, Feng, et al. "Improved affine motion prediction" JVET-C0062_v2, Joint Video Exploration Team (JVET) of ITU-T SG 16 WP 3 and ISO/IEC JTC 1/SC 29/WG 11 3rd Meeting: Geneva, CH, May 26-Jun. 1, 2016, (5 pages).
(Continued)

*Primary Examiner* — Jared Walker
(74) *Attorney, Agent, or Firm* — NSIP Law

(57) ABSTRACT

There is provided a method of decoding an image, the method comprising: decoding information for motion information prediction of a current block from a bitstream, predicting motion information of the current block based on the information, refining motion information of the current
(Continued)

block by using the decoded information and the predicted motion information of the current block and reconstructing the current block based on the refined motion information of the current block.

8 Claims, 24 Drawing Sheets

Related U.S. Application Data continuation of application No. 17/378,075, filed on Jul. 16, 2021, now Pat. No. 11,570,463, which is a continuation of application No. 16/736,197, filed on Jan. 7, 2020, now Pat. No. 11,102,503.

(51) Int. Cl.
*H04N 19/182* (2014.01)
*H04N 19/184* (2014.01)

(56) References Cited

U.S. PATENT DOCUMENTS

| | | |
|---|---|---|
| 2018/0295282 A1 | 10/2018 | Boyce et al. |
| 2018/0359483 A1 | 12/2018 | Chen et al. |
| 2018/0376149 A1 | 12/2018 | Zhang et al. |

FOREIGN PATENT DOCUMENTS

| | | |
|---|---|---|
| KR | 10-2018-0107006 A | 10/2018 |
| KR | 10-1910286 B1 | 10/2018 |

OTHER PUBLICATIONS

U.S. Appl. No. 18/085,678, filed Dec. 21, 2022, Gun Bang et al., Electronics and Telecommunications Research Institute.

[FIG. 1A]
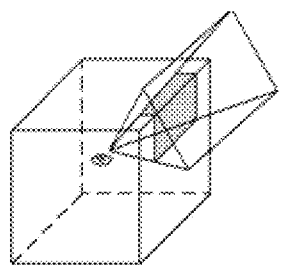
[FIG. 1B]
[FIG. 1C]
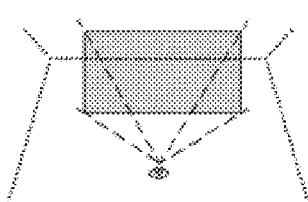
[FIG. 2A]
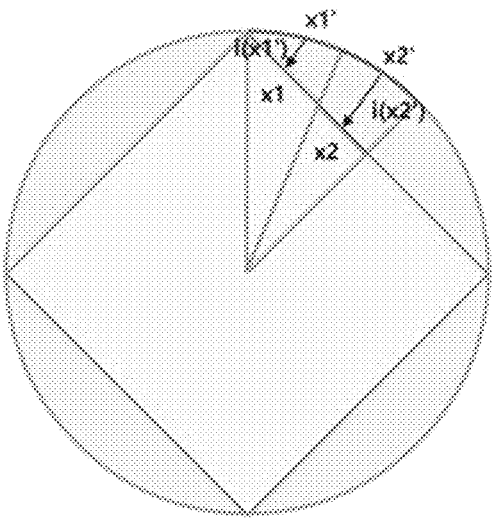
[FIG. 2B]
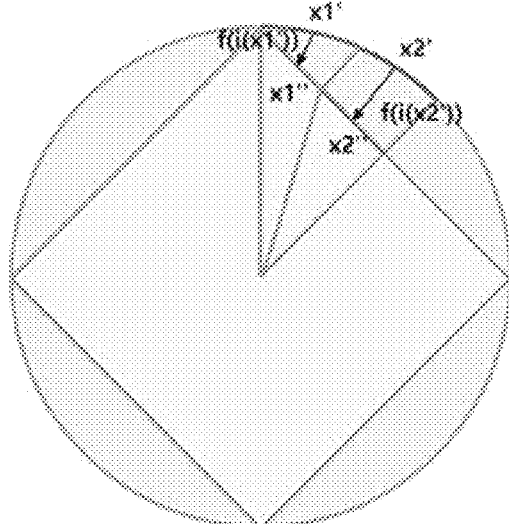

[FIG. 3]
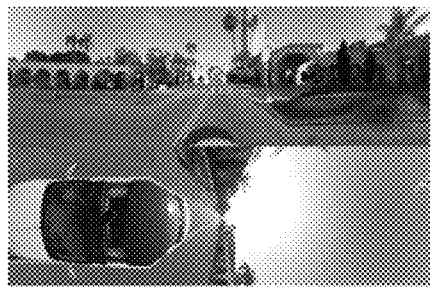
CMP
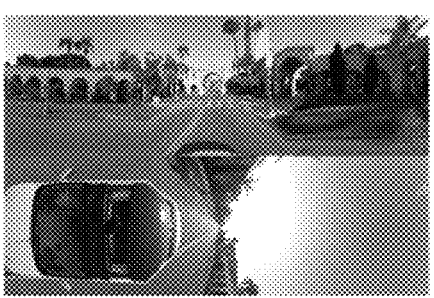
EAC
2D to 3D
$h(x) = x' = (x + 0.5) * 2 / A - 1, \quad 0 \leq x < A$   (1)
$j(x') = x'' = \tan(\pi/4 \, x')$   (2)
$h(y) = y' = (y + 0.5) * 2 / A - 1, \quad 0 \leq y < A$   (3)
$j(y') = y'' = \tan(\pi/4 \, y')$   (4)
3D to 2D
$i(x') = x = (x' + 1) * A / 2 + 0.5$   (5)
$k(x'') = x' = (4/\pi) * \tan^{-1}(x'')$   (6)
$i(y') = y = (y' + 1) * A / 2 + 0.5$   (7)
$k(y'') = y' = (4/\pi) * \tan^{-1}(y'')$   (8)
A = Length of a facing side
[FIG. 4]
EAC
HEC

[FIG. 5]
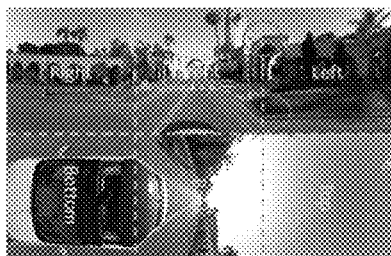
EAC
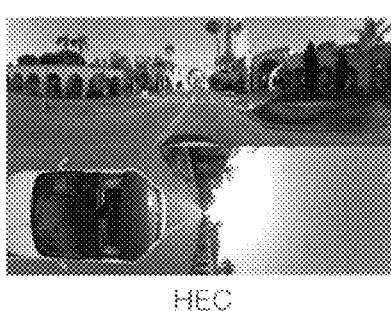
HEC
2D to 3D
$h(x) = x' = (x + 0.5) * 2/A - 1, \quad 0 \leq x < A$  (1)
$j(x') = x'' = \tan(\pi/4 \, x')$  (2)
$h(y) = x' = (y + 0.5) * 2/A - 1, \quad 0 \leq y < A$  (3)
$k(y') = y'' = \dfrac{y'}{1 + 0.4(1 - x'^2)(1 - y'^2)}$  (4)
3D to 2D
$i(x') = x = (x' + 1) * A/2 + 0.5$  (5)
$k(x'') = x' = (4/\pi) * \tan^{-1}(x'')$  (6)
$i(y') = y = (y' + 1) * A/2 + 0.5$  (7)
$m(y'') = y' = \begin{cases} y'' & \text{if } t = 0 \\ \frac{t}{y''} & \text{otherwise} \end{cases}, \text{ where } t = 0.4y''(g(x')^2 - 1)$  (8)
A= Length of a facing side
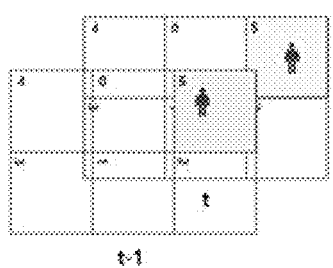
t-1
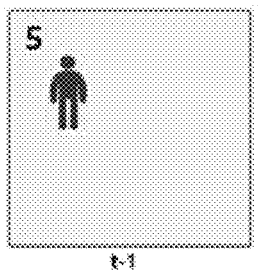
t-1
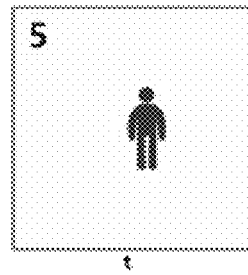
t
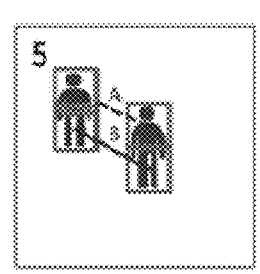
[FIG. 6A]   [FIG. 6B]   [FIG. 6C]   [FIG. 6D]

[FIG. 7A]
CMP
[FIG. 7B]
HEC
[FIG. 7C]
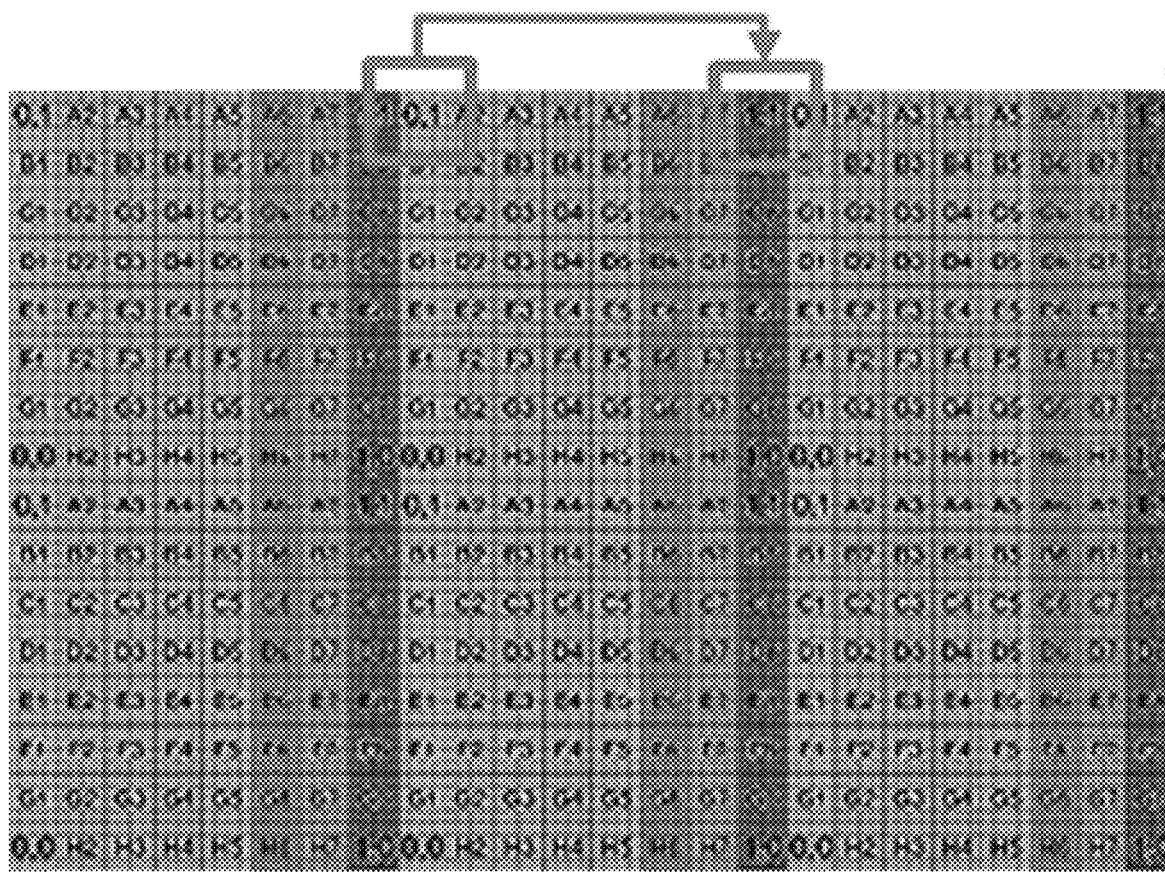

【FIG. 7D】
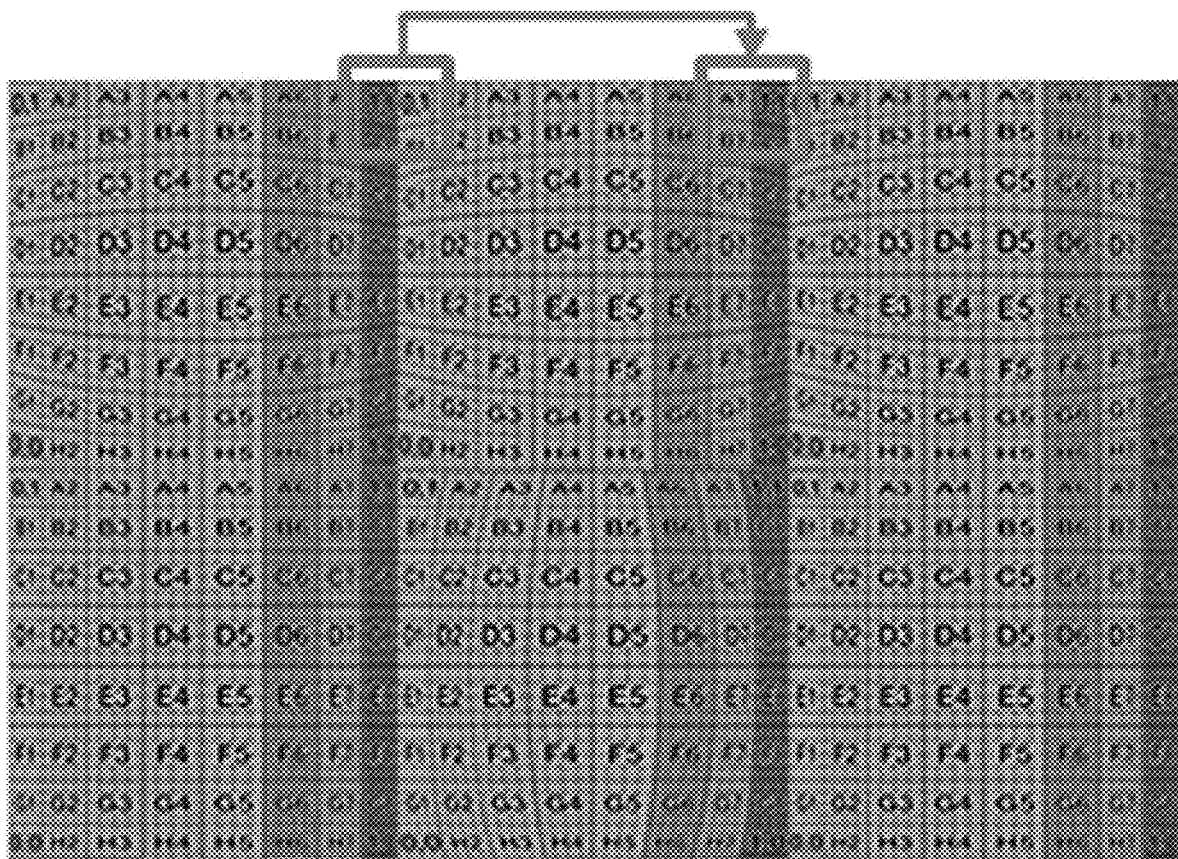
【FIG. 7E】
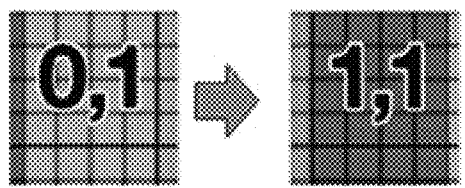
【FIG. 7F】
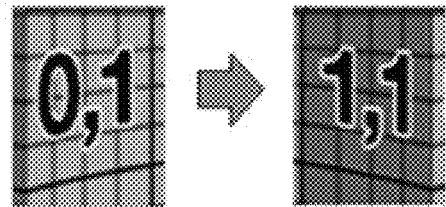

[FIG. 8]
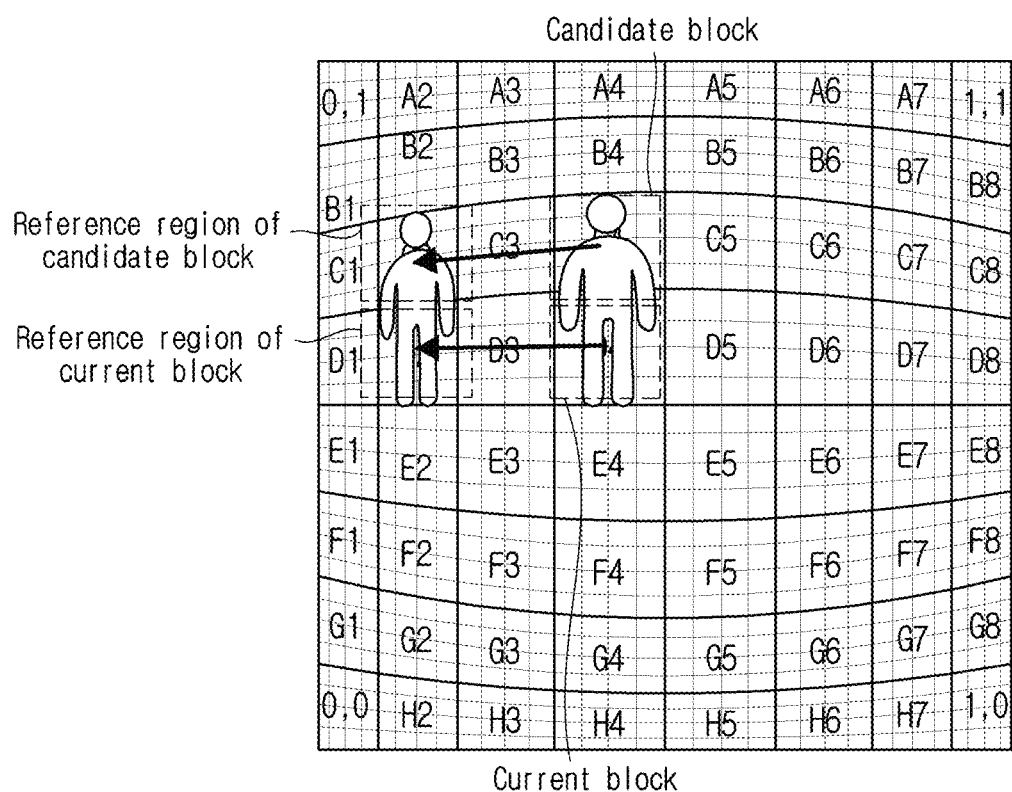

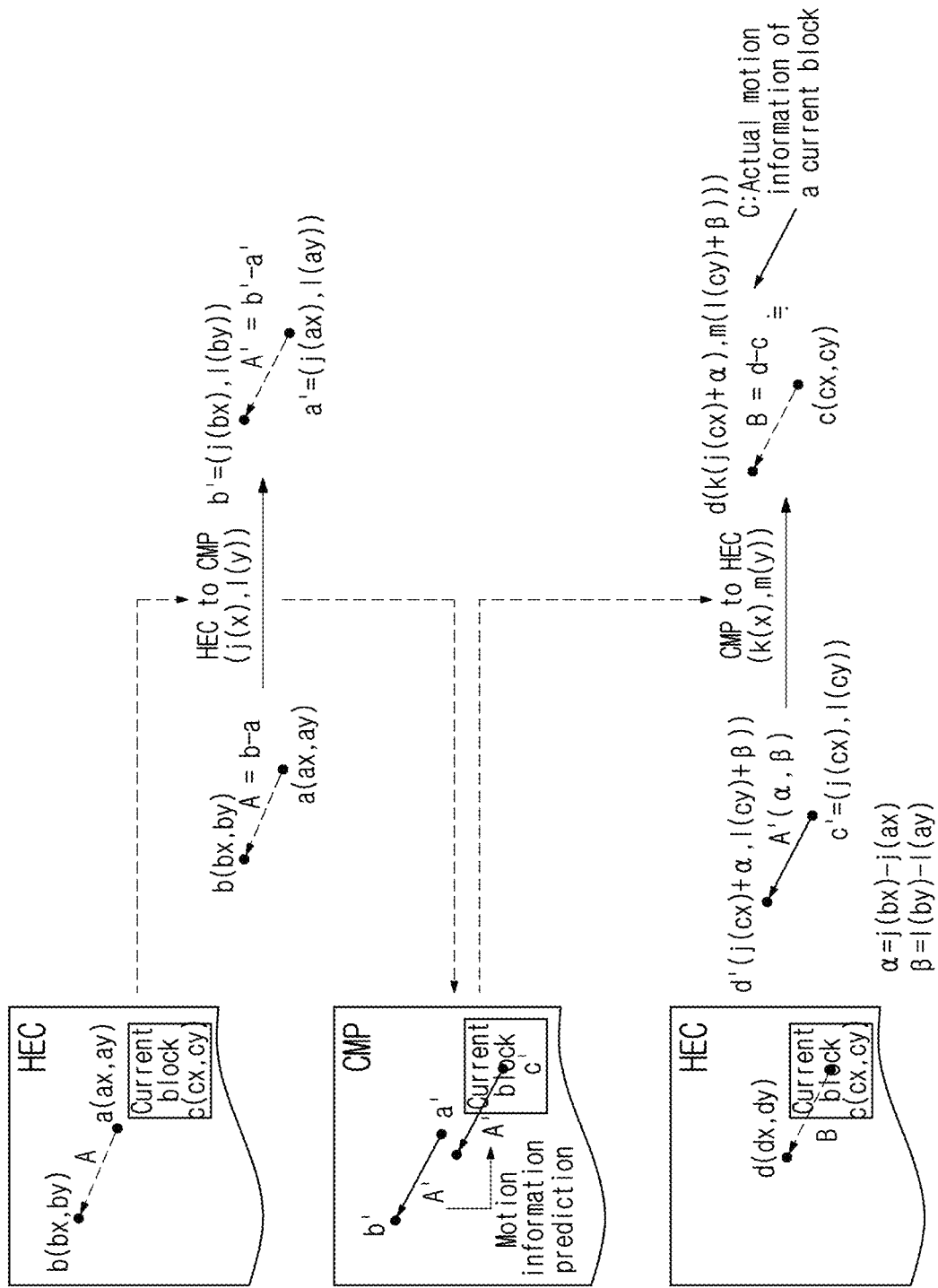
[FIG. 9]

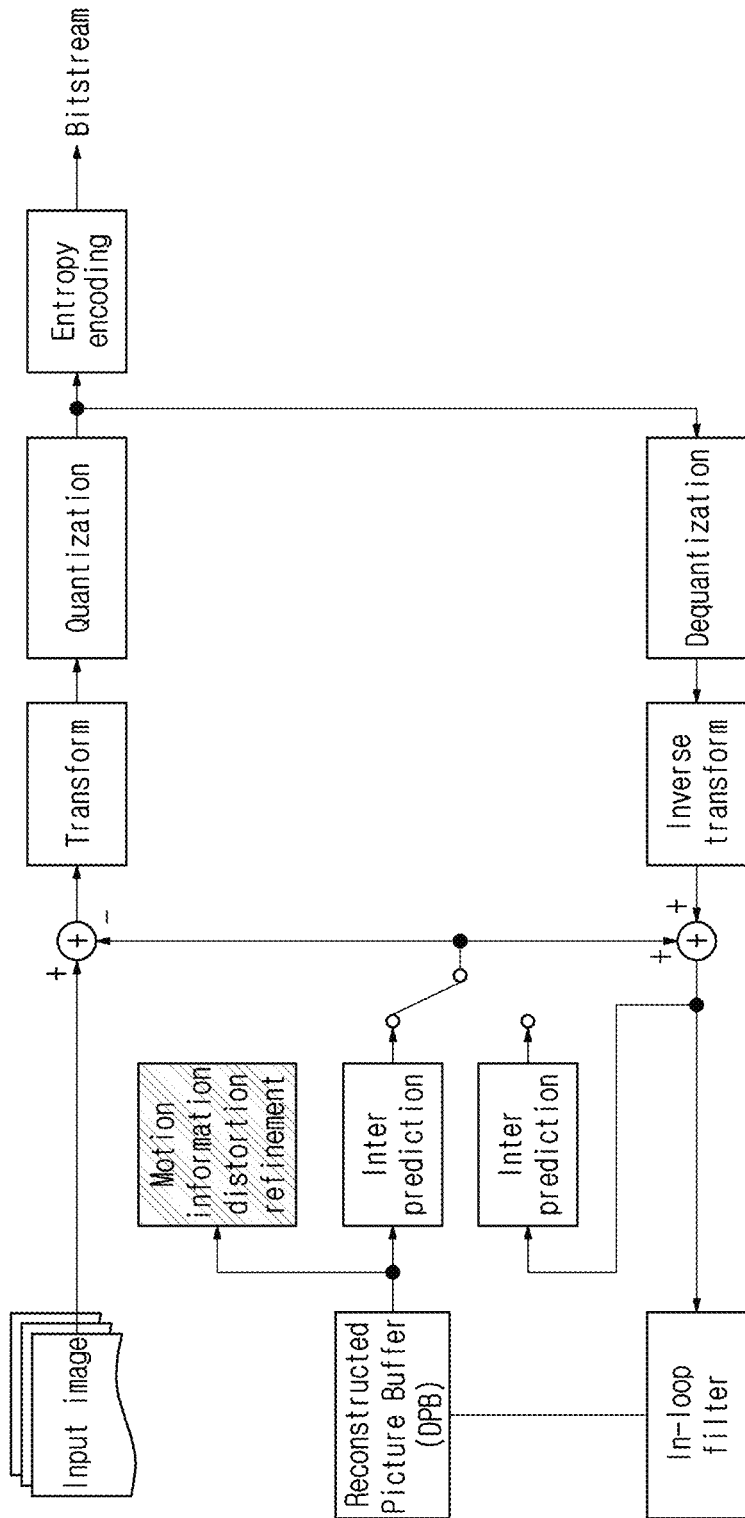
[FIG. 10]

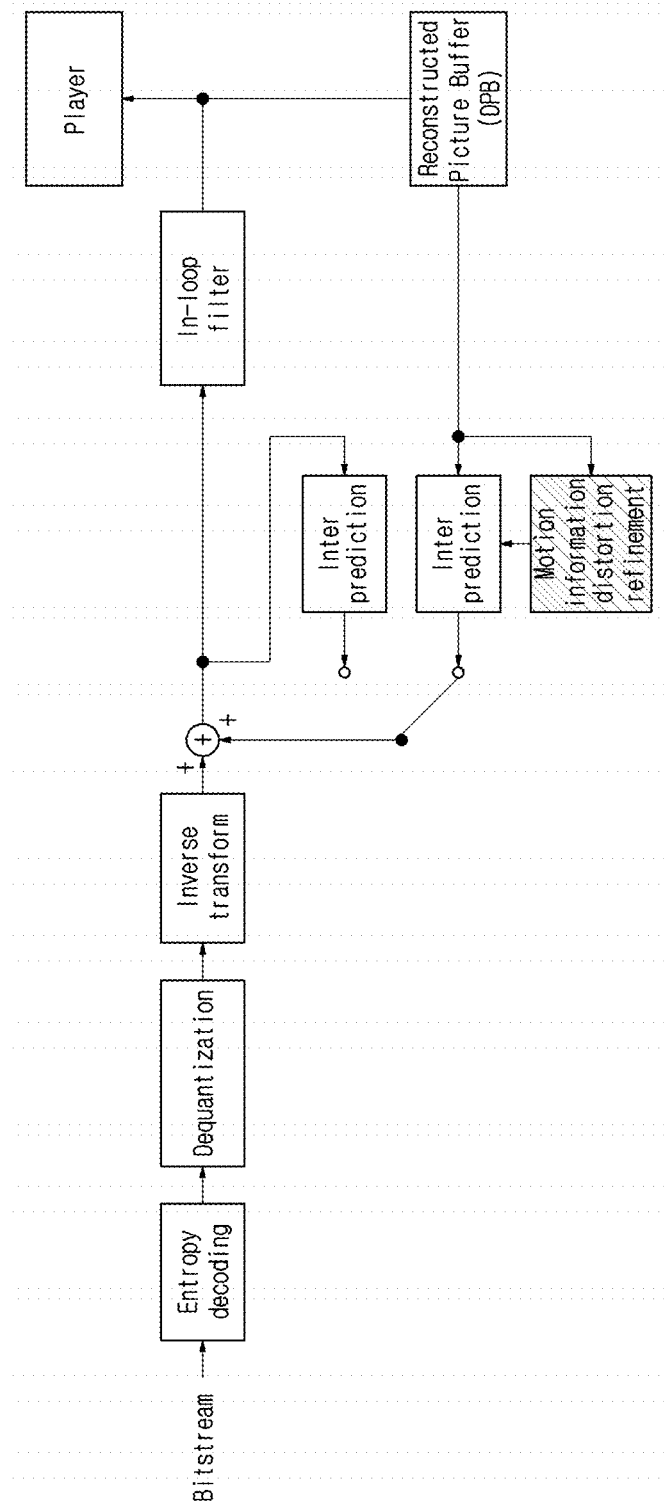
[FIG. 11]

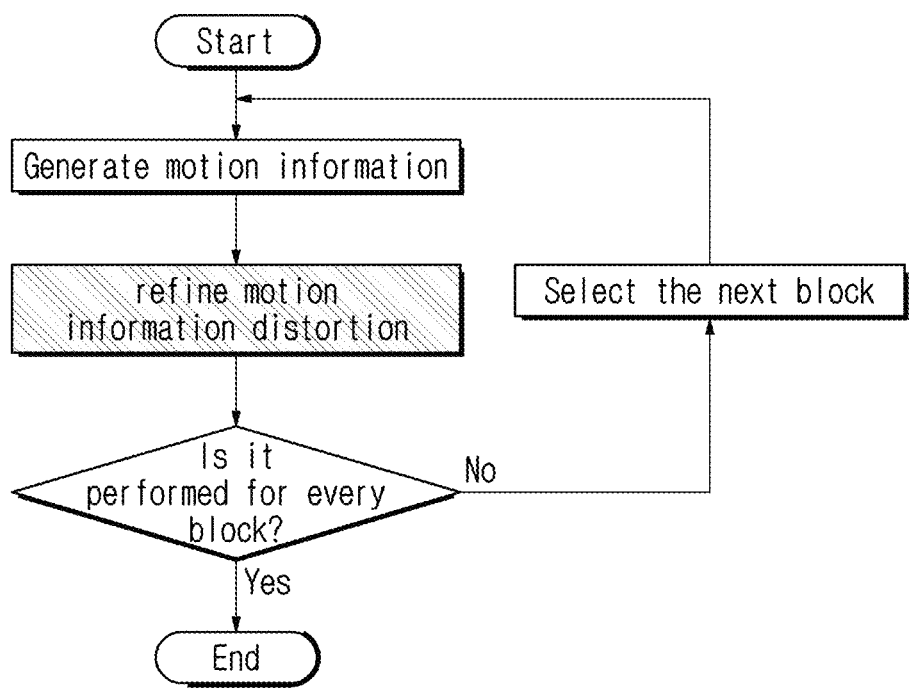
[FIG. 12]

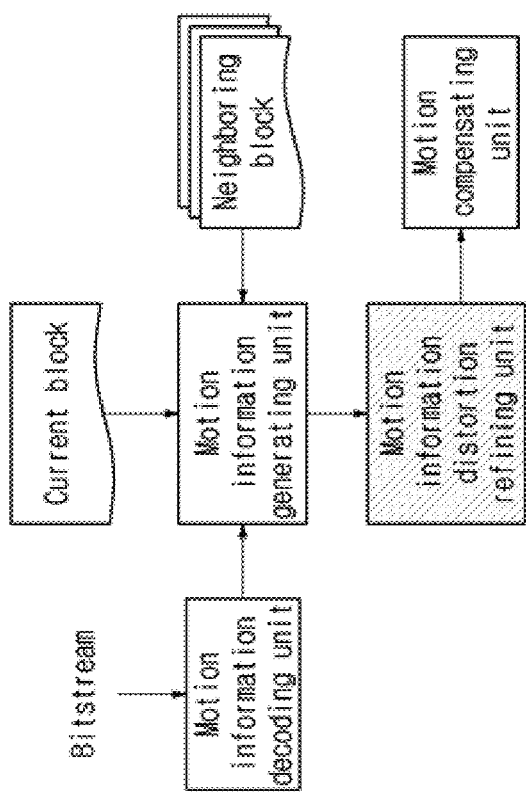
[FIG. 13B]
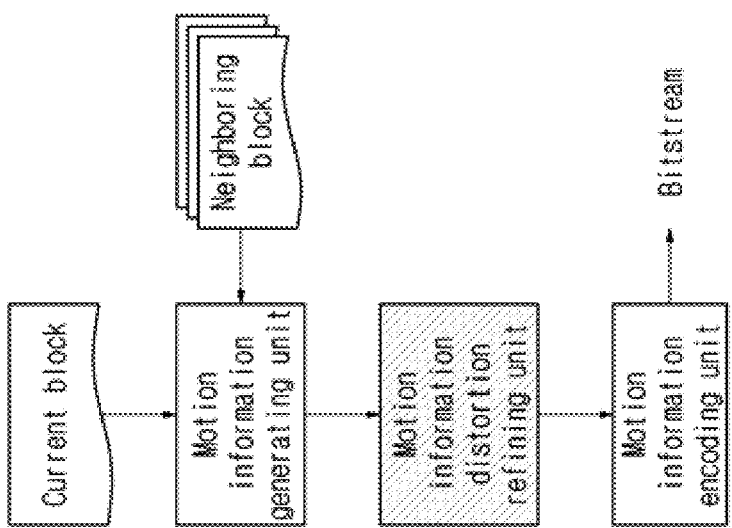
[FIG. 13A]

[FIG. 14]
[FIG. 15]
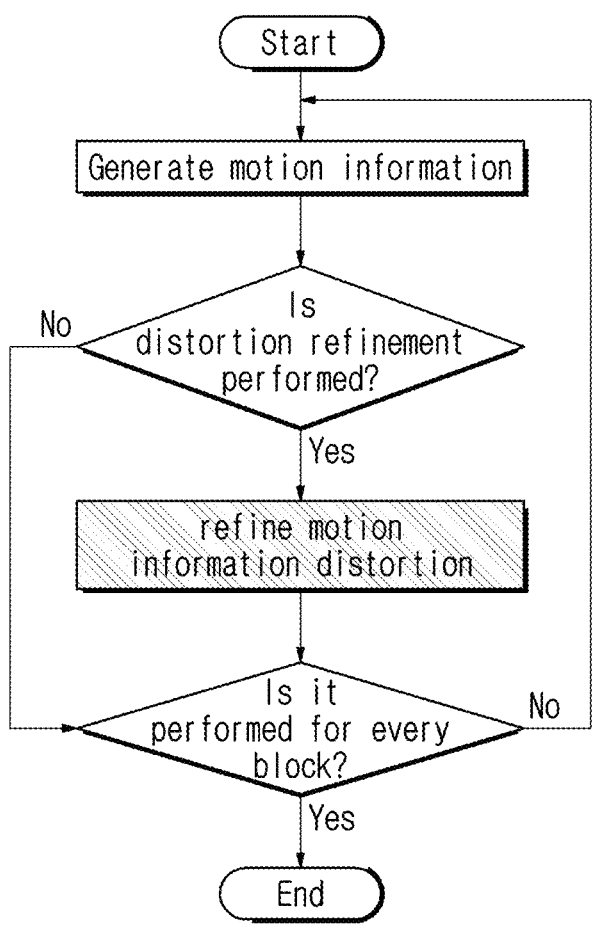

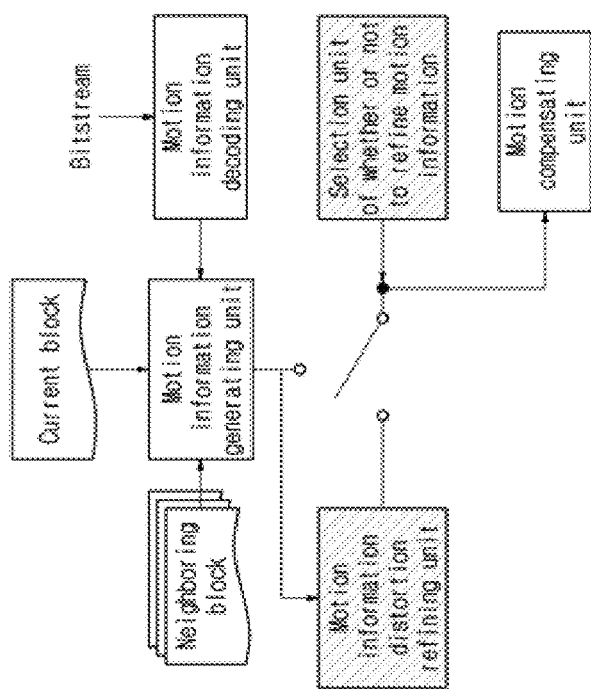
[FIG. 16B]
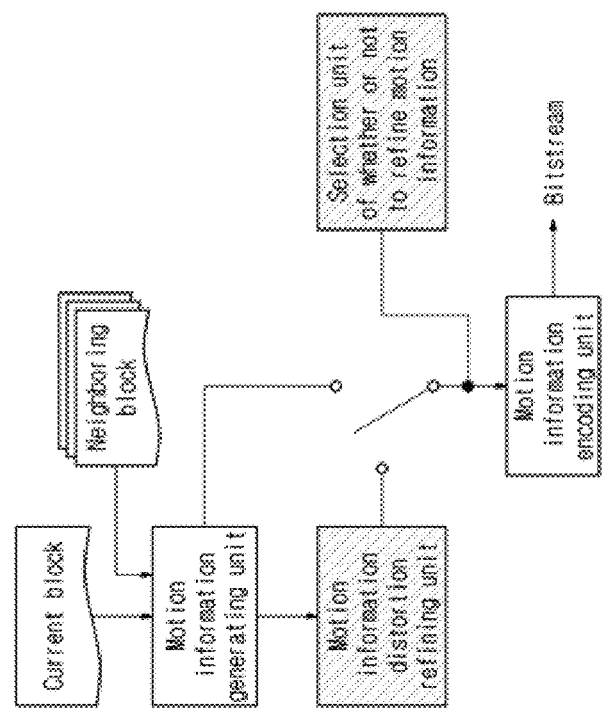
[FIG. 16A]

[FIG. 17A]
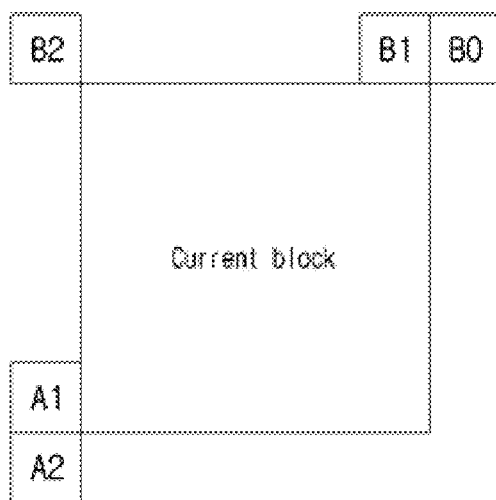
[FIG. 17B]
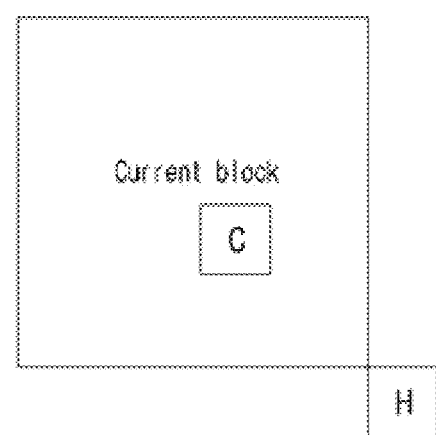
[FIG. 18]
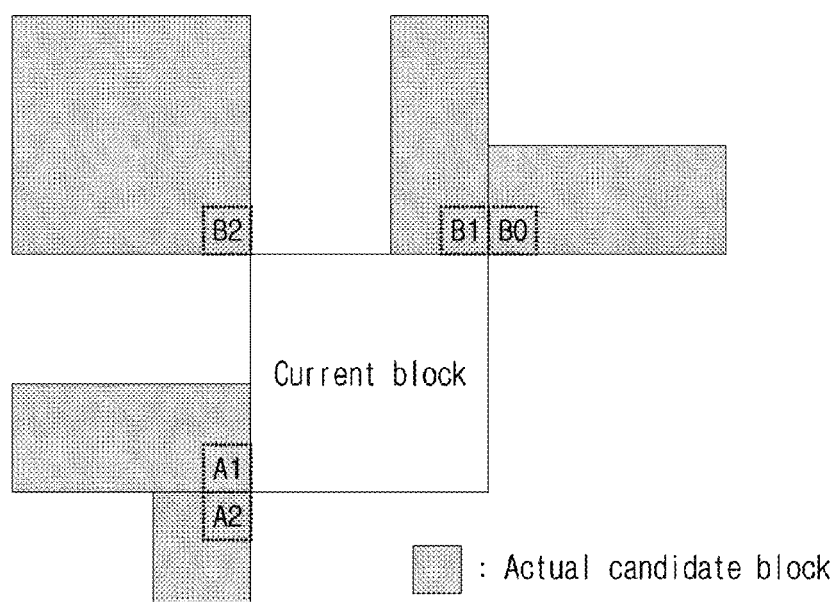

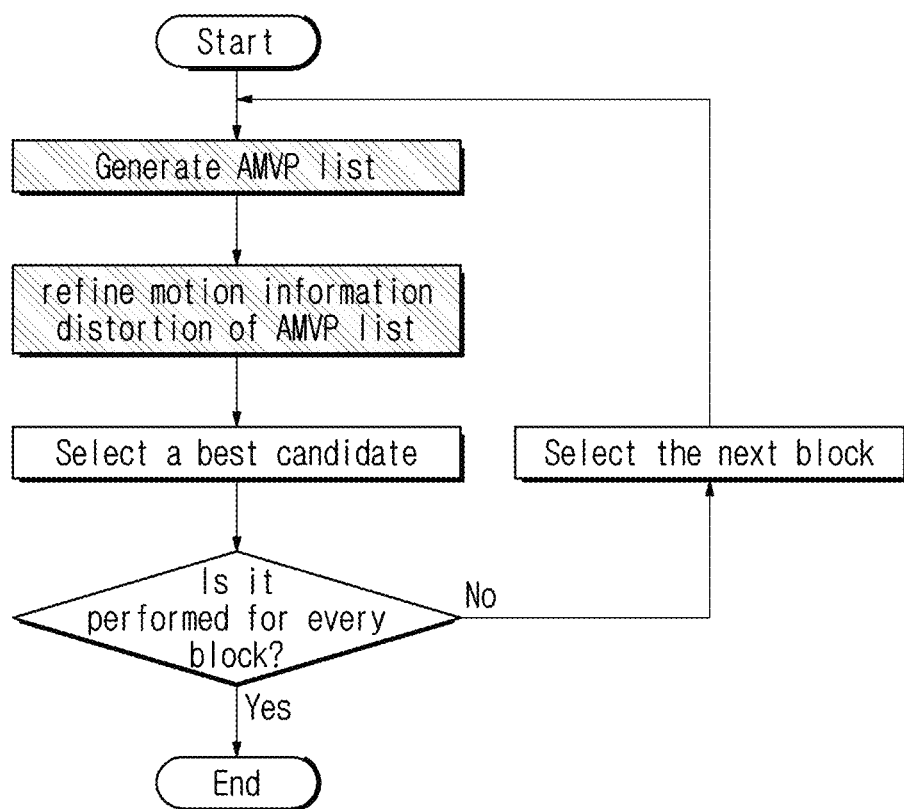
[FIG. 19]

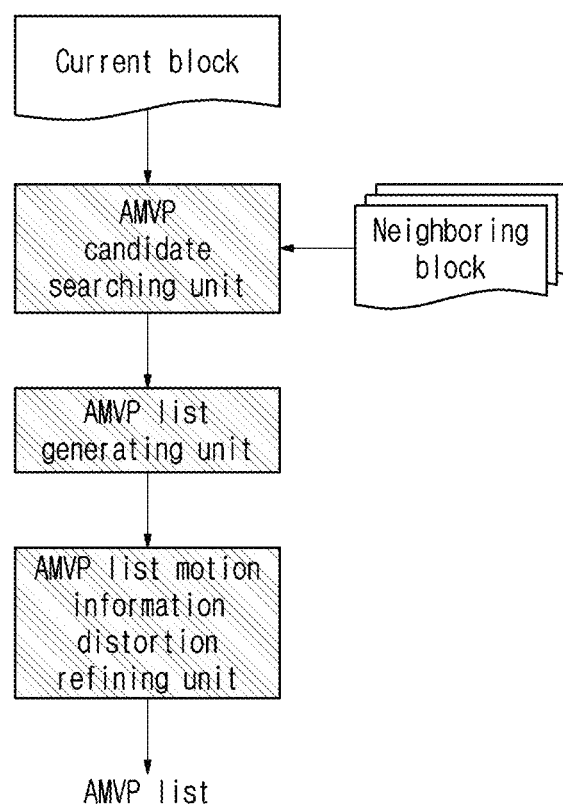
[FIG. 20]

[FIG. 21]
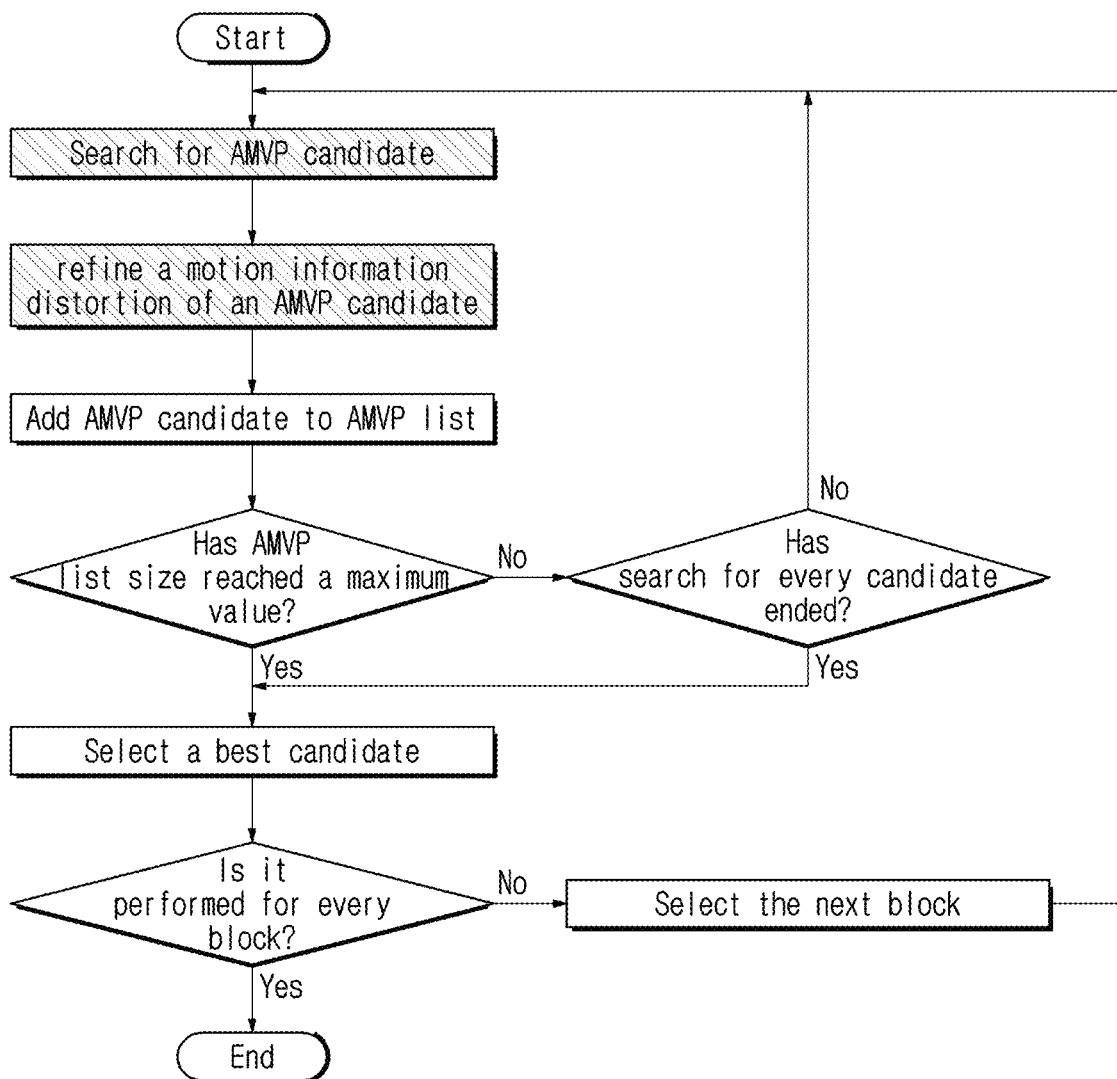

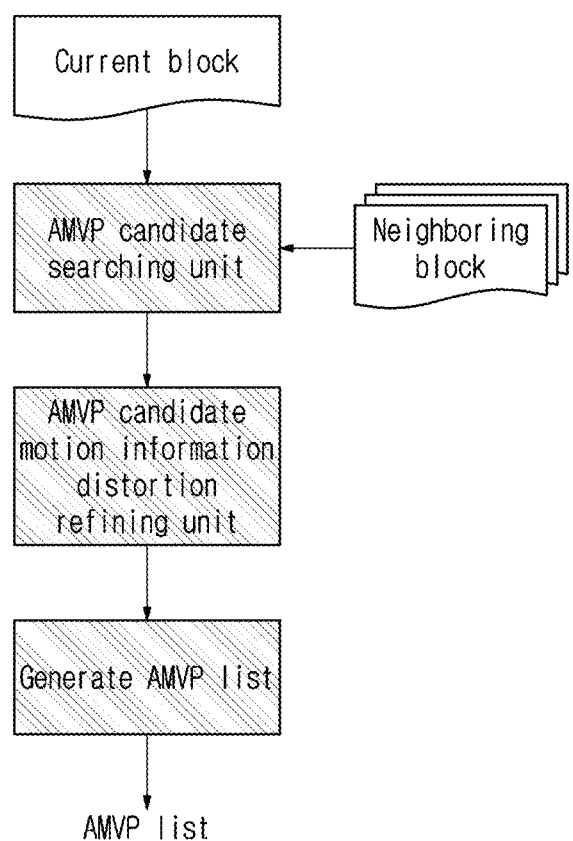
[FIG. 22]

[FIG. 23]
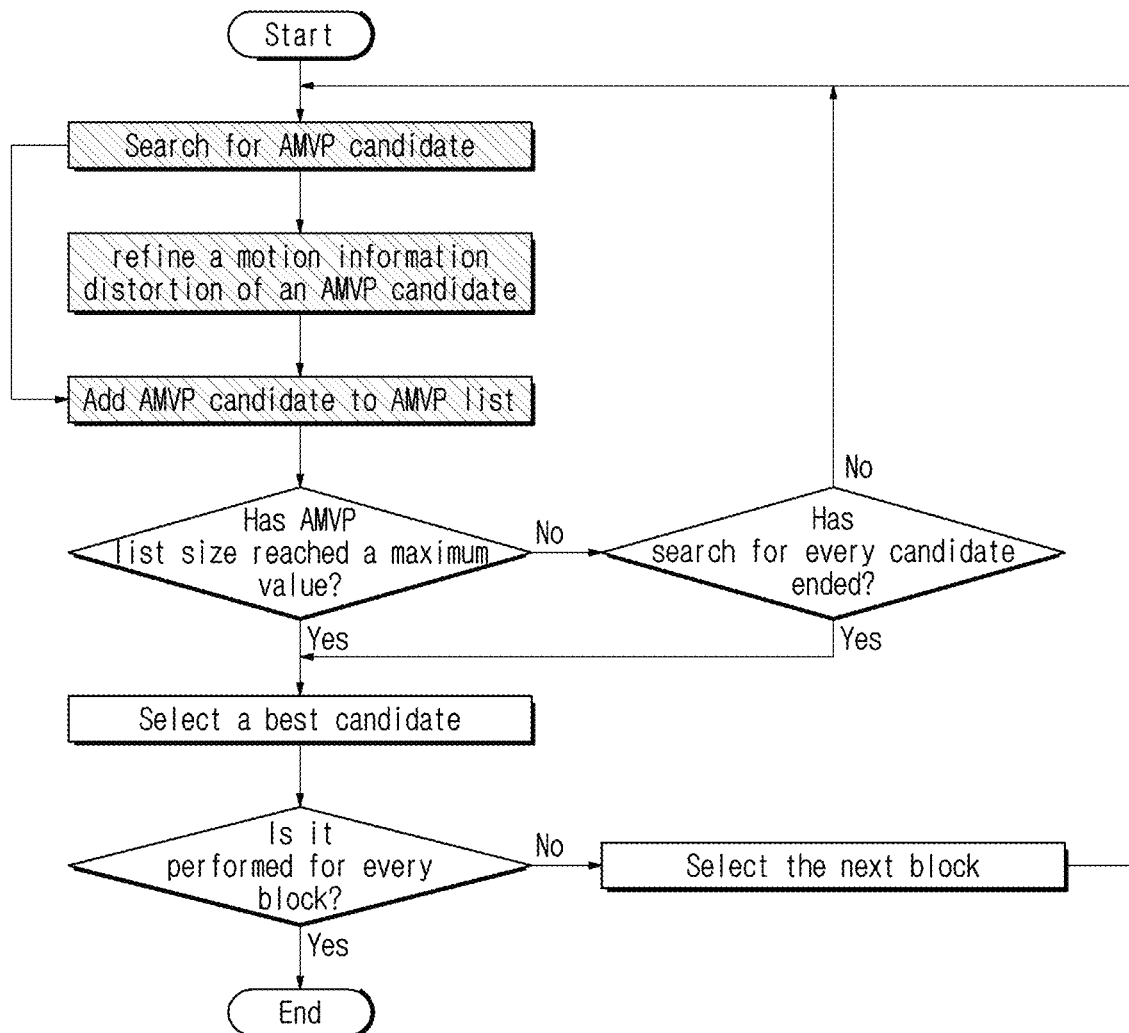

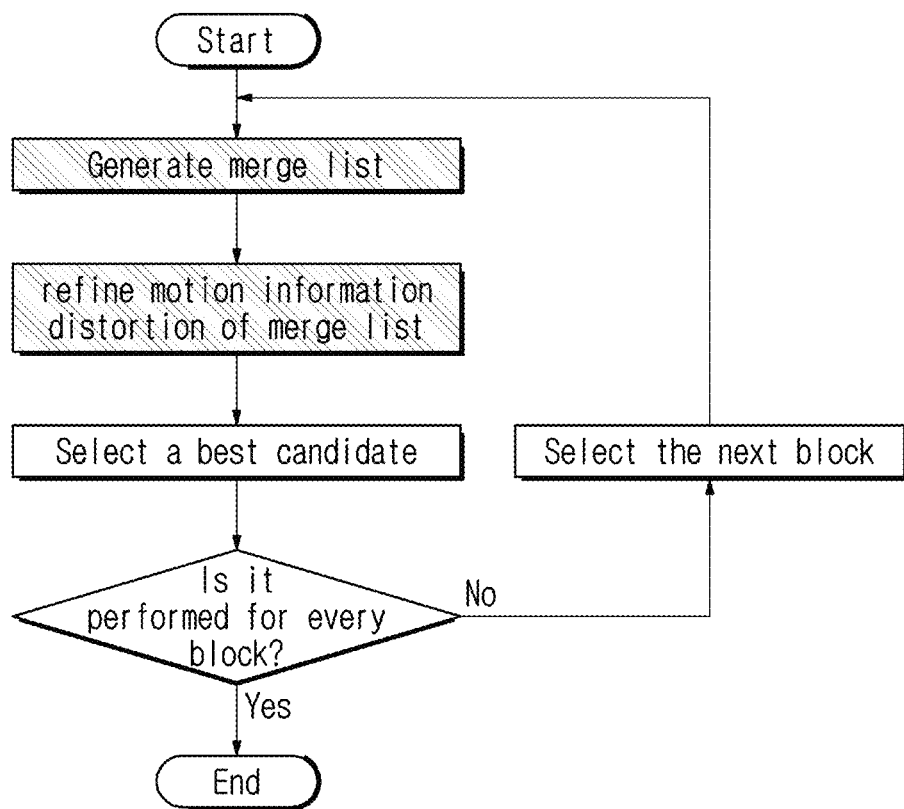
[FIG. 24]

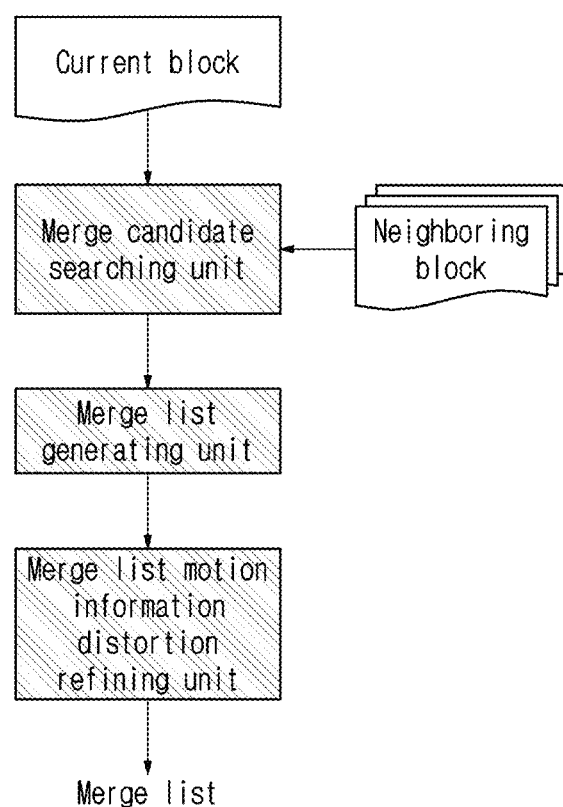
[FIG. 25]

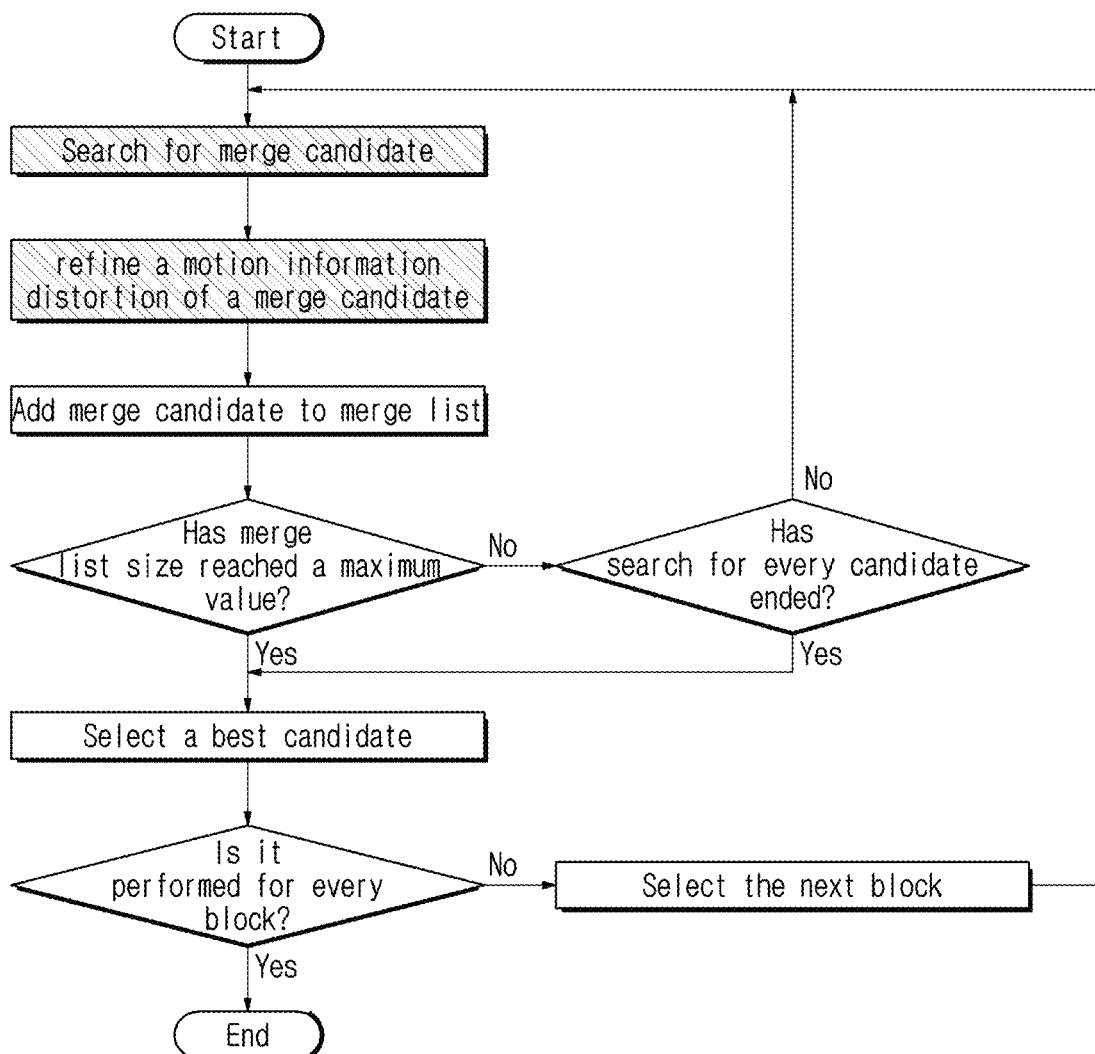
[FIG. 26]

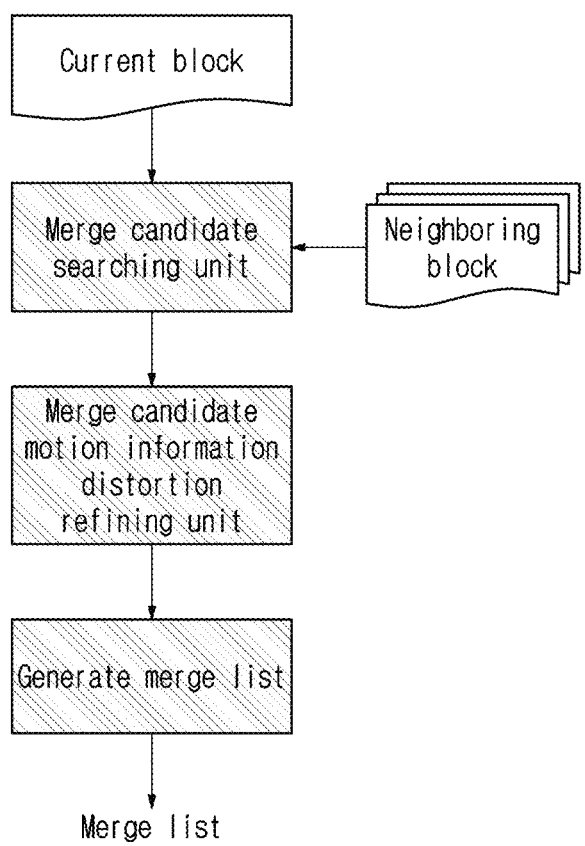
[FIG. 27]

【FIG. 28】
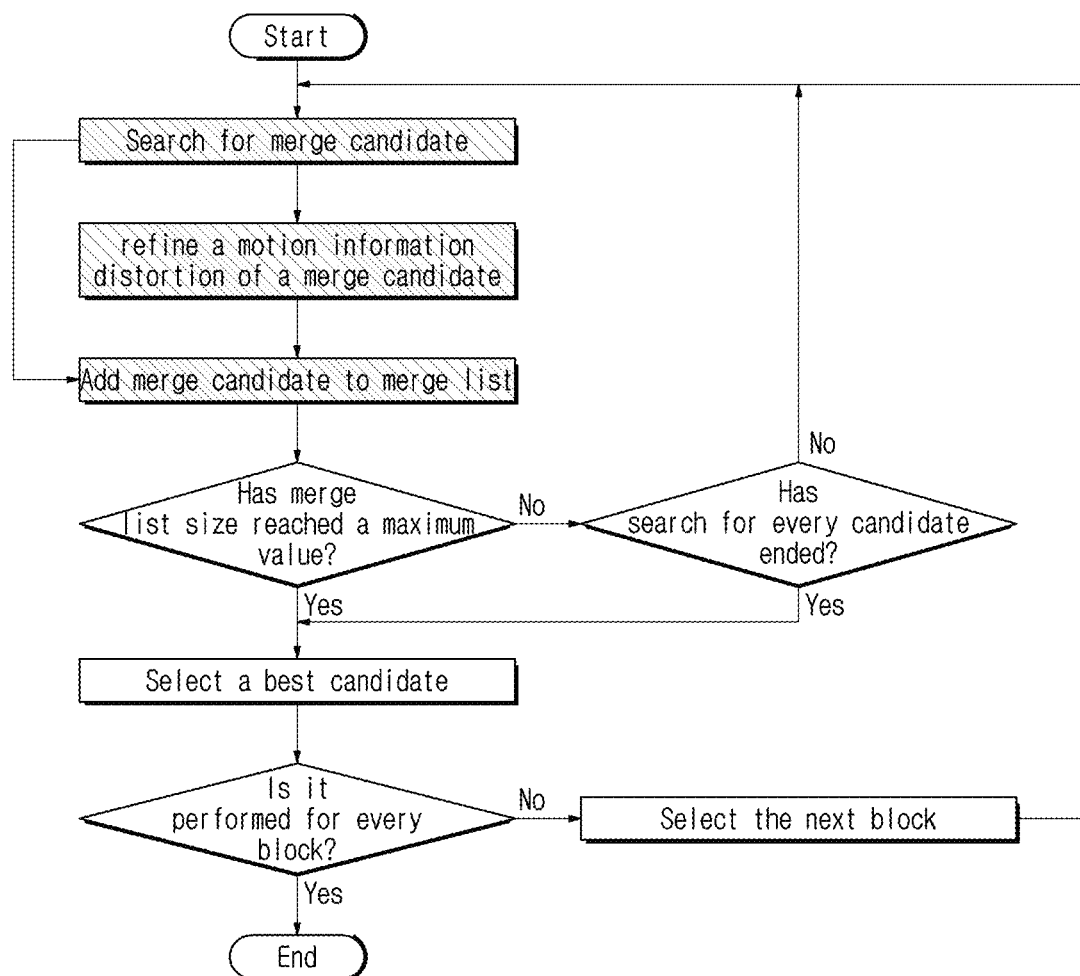

MOTION INFORMATION PREDICTION METHOD AND APPARATUS FOR DISTORTION DUE TO PROJECTION FORMATION CONVERSION

CROSS REFERENCE TO RELATED APPLICATION

The present application is a Continuation application of U.S. patent application Ser. No. 18/085,678, filed on Dec. 21, 2022, which is a Continuation application of U.S. patent application Ser. No. 17/378,075, filed on Jul. 16, 2021, now U.S. Pat. No. 11,570,463, issued on Jan. 31, 2023, which is a Continuation application of U.S. patent application Ser. No. 16/736,197, filed on Jan. 7, 2020, now U.S. Pat. No. 11,102,503, which claims priority to Korean Patent Application No. 10-2019-0001726 filed Jan. 7, 2019 and No. 10-2020-0002240 filed Jan. 7, 2020, the entire contents of which are incorporated herein for all purposes by this reference.

BACKGROUND OF THE INVENTION

Field of the Invention

The present invention relates to a video encoding/decoding method, apparatus, and a recording medium storing a bitstream. More particularly, the present invention relates to a video encoding/decoding method and apparatus refining a distortion generated by a projection format, and to a recording medium storing a bitstream generated by the video encoding/decoding or apparatus of the present invention.

Description of the Related Art

Recently, as broadcasting services with HD (High Definition, 1920×1080) or UHD (Ultra High Definition, 3840×2160) resolution have been expanded not only in Korea but also in the world, many users are accustomed to high resolution and high quality images, and many organizations are accelerating the development of next generation video equipment.

Currently, MPEG (Moving Picture Experts Group) and VCEG (Video Coding Experts Group) are jointly standardizing VVC (Versatile Video Coding), that is, the next generation video codec succeeding the existing video codec HEVC(High Efficiency Video Coding). In VVC, beyond the existing 2D images, realistic images like 360 degree images through head-mounted displays are also actively being researched.

SUMMARY OF THE INVENTION

An object of the present invention is to provide a video encoding/decoding method and apparatus with enhanced compression efficiency.

Another object of the present invention is to provide a video encoding/decoding method and apparatus that refine a distortion generated by a projection format with enhanced compression efficiency.

Another object of the present invention is to provide a recording medium storing a bitstream generated by a video encoding/decoding method or apparatus of the present invention.

According to the present invention, there is provided a method of decoding an image, the method comprising: decoding information for motion information prediction of a current block from a bitstream; predicting motion information of the current block based on the information; refining motion information of the current block by using the decoded information and the predicted motion information of the current block; and reconstructing the current block based on the refined motion information of the current block.

The decoded information may comprise information concerning whether or not to perform a motion information refinement of a current block.

The information concerning whether or not to perform a motion information refinement of a current block may be signaled from at least one of a sequence parameter set and a picture parameter set.

The refining of motion information of a current block may comprise refining the motion information of the current block by using a pixel value in L0 reference picture and L1 reference picture for the current block.

The decoded information may comprise information concerning whether or not the L0 reference picture and the L1 reference picture are available.

The predicting of motion information of a current block may comprise: predicting the motion information of the current block by using motion information of a neighboring block of the current block, and the neighboring block comprises at least one among a block adjacent to the right of the current block, a block adjacent to the left of the current block and a col block.

The motion information of the neighboring block may be at least one of motion information before motion information refinement is performed and motion information after motion information refinement is performed.

The refining of motion information of a current block may comprise refining the motion information of the current block based on at least one among a motion size of the predicted current block, a face position of the current block and a characteristic of block within the face.

The current block may be a block that is converted into a predetermined projection format.

The projection format may be an HEC (Hybrid Equi-Angular Cube Map) format.

Also, according to the present invention, there is provided a method of encoding an image, the method comprising: predicting motion information of a current block; determining whether or not to perform refinement for the predicted motion information of the current block; and encoding motion information of the current block based on the determination.

The encoded information may comprise information concerning whether or not to perform a motion information refinement of a current block.

The information concerning whether or not to perform motion information refinement of a current block may be signaled from at least one of a sequence parameter set and a picture parameter set.

The encoding of motion information of a current block may comprise encoding the motion information of the current block by using a pixel value in L0 reference picture and L1 reference picture for the current block.

The encoded information may comprise information concerning whether or not the L0 reference picture and the L1 reference picture are available.

The predicting of motion information of a current block may comprise predicting the motion information of the current block by using motion information of a neighboring block of the current block, and the neighboring block comprises at least one among a block adjacent to the right of the current block, a block adjacent to the left of the current block and a col block.

The motion information of the neighboring block may be at least one of motion information before motion information refinement is performed and motion information after motion information refinement is performed.

The encoding of motion information of a current block may comprise encoding the motion information of the current block based on at least one among a motion size of the predicted current block, a face position of the current block and a characteristic of block within the face.

The current block may be a block that is converted into a predetermined projection format.

Also, according to the present invention, there is provided a non-transitory computer readable recording medium storing a bitstream that is received and decoded by an image decoding apparatus and is used to reconstruct an image, wherein the bitstream comprises information for motion information prediction of a current block, the information for the motion information prediction of the current block is used to predict motion information of the current block, the motion information of the current block is used to refine the motion information of the current block together with the decoded information, and the refined motion information of the current block is used to reconstruct the current block.

According to the present invention, it is possible to provide a video encoding/decoding method and apparatus with enhanced compression efficiency.

According to the present invention, it is possible to provide a video encoding/decoding method and apparatus that refine a distortion generated by a projection format with enhanced compression efficiency.

According to the present invention, it is possible to provide a recording medium storing a bitstream generated by a video encoding/decoding method or apparatus of the present invention.

BRIEF DESCRIPTION OF THE DRAWINGS

FIGS. 1A-1C are views showing a 360 degree image according to an embodiment of the present invention.

FIGS. 2A-2B are views showing image sample size refinement according to an embodiment of the present invention.

FIG. 3 is a view showing a conversion equation of EAC format according to an embodiment of the present invention.

FIG. 4 is a view showing a difference between an EAC image and an HEC image according to an embodiment of the present invention.

FIG. 5 is a view showing a conversion equation of HEC format according to an embodiment of the present invention.

FIGS. 6A-6D are views showing a change of motion information due to distortion generated by a sample refinement in an HEC image according to an embodiment of the present invention.

FIGS. 7A-7F are views showing a distortion comparison between a CMP image and an HEC image according to an embodiment of the present invention.

FIG. 8 is a view showing a process where the accuracy of a motion information prediction decreases due to a parallel movement in an HEC image according to an embodiment of the present invention.

FIG. 9 is a view showing a process of performing distortion refinement when the motion information of a current block is predicted, according to an embodiment of the present invention.

FIG. 10 is a block diagram illustrating a configuration of an encoder to which a motion information distortion refinement is applied, according to an embodiment of the present invention.

FIG. 11 is a block diagram illustrating a configuration of a decoder to which a motion information distortion refinement is applied, according to an embodiment of the present invention.

FIG. 12 is a flowchart illustrating an operating method of an encoder/decoder performing a motion information distortion refinement in motion information prediction according to an embodiment of the present invention.

FIGS. 13A-13B are block diagrams illustrating a configuration of an encoder/decoder performing a motion information distortion refinement in motion information prediction according to an embodiment of the present invention.

FIG. 14 is a view showing a face division of a picture in a 360 degree image format according to an embodiment of the present invention.

FIG. 15 is a flowchart illustrating an operating method of an encoder/decoder that selectively performs a motion information distortion refinement according to an embodiment of the present invention.

FIGS. 16A-16B are block diagrams illustrating a configuration of an encoder/decoder selectively performing a motion information distortion refinement according to an embodiment of the present invention.

FIGS. 17A-17B are views showing a temporal/spatial candidate configuration of a current block according to an embodiment of the present invention.

FIG. 18 is a view showing a reference position of a candidate block and a configuration of an actual candidate block at the reference position according to an embodiment of the present invention.

FIG. 19 is a flowchart illustrating an operating method of an apparatus performing motion information distortion refinement of an AMVP list according to an embodiment of the present invention.

FIG. 20 is a block diagram illustrating a configuration of an apparatus performing motion information distortion refinement of an AMVP list according to an embodiment of the present invention.

FIG. 21 is a flowchart illustrating an operating method of an apparatus performing motion information distortion refinement for an AMVP candidate according to an embodiment of the present invention.

FIG. 22 is a block diagram illustrating a configuration of an apparatus performing motion information distortion refinement for an AMVP candidate according to an embodiment of the present invention.

FIG. 23 is a flowchart illustrating an operating method of an apparatus using both a general AMVP candidate and an AMVP candidate, for which motion information distortion refinement is performed, as AMVP candidate, according to an embodiment of the present invention.

FIG. 24 is a flowchart illustrating an operating method of an apparatus performing motion information distortion refinement of a merge list according to an embodiment of the present invention.

FIG. 25 is a block diagram illustrating a configuration of an apparatus performing motion information distortion refinement of a merge list according to an embodiment of the present invention.

FIG. 26 is a flowchart illustrating an operating method of an apparatus performing motion information distortion refinement for a merge candidate according to an embodiment of the present invention.

FIG. 27 is a block diagram illustrating a configuration of an apparatus performing motion information distortion refinement for a merge candidate according to an embodiment of the present invention.

FIG. 28 is a flowchart illustrating an operating method of an apparatus using both a general merge candidate and a merge candidate, for which motion information distortion refinement is performed, as merge candidate, according to an embodiment of the present invention.

DETAILED DESCRIPTION OF THE INVENTION

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

FIGS. 1A-1O are views showing a 360 degree image according to an embodiment of the present invention.

A 360 degree image may project an image stored in a two-dimensional space as illustrated in FIG. 1A to a three-dimensional space as illustrated in FIG. 1B, thereby showing the image to a user. As illustrated in FIG. 1O, a user may watch an image projected from inside to his or her surroundings and thus may be able to experience as if being in the image.

In 360 degree image, there are many methods for storing an image in a two-dimensional space, as illustrated in FIG. 1A, and for projecting an image, as illustrated in FIG. 1B. VVC specifies such methods in a specific projection format. For example, as shown in FIG. 1A, CMP (Cube Map Projection) format is a projection format method that has six sides in two dimensions and projects each of the six sides to the corresponding six sides of a three-dimensional cube. In addition, ERP (Equi-rectangular Projection) format is a projection format method that projects a two-dimensional image of a rectangle to a sphere and provides a user with the image. All the project formats, which are being currently discussed in VVC, are formats that have been converted from an ERP format projecting an image information of a sphere to a two-dimensional image of a rectangle. Therefore, since performance is basically measured by using a format converted from an ERP format, in the case of a CMP projection format, each sample information in an ERP format is unequally projected.

FIGS. 2A-2B are views showing image sample size refinement according to an embodiment of the present invention.

FIG. 2A is an example showing why an image sample is unequally projected during conversion of an ERP format to a CMP format. Referring FIG. 2A, x1' and x2' may be image samples covering a same region in a sphere. When the image samples are subjected to a conversion equation i(x) by which they are projected from a sphere to a cube, x1 and x2, which are the respective distances of the samples from the sphere to the cube, may be different from each other. Due to such a distance difference, x1 and x2, which have been subjected to a conversion equation, cover regions with different sizes. Accordingly, there may be a difference of image sample size. In order to solve the problem, various types of projection formats are proposed which have an additional sample size refinement in the existing CMP conversion. EAC (Equi-Angular Cube Map) format is a projection format that applies an additional refinement equation f(x) to equalize samples, as shown in FIG. 2B. Referring to FIG. 2B, by applying a conversion equation i(x) as in CMP format first and then a refinement equation f(x), which considers a distance difference between a sphere and a cube, to x1' and x2', samples x1" and x2" that are projected to a cube may have a same size.

FIG. 3 is a view showing a conversion equation of EAC format according to an embodiment of the present invention.

Referring to FIG. 3, the equations h(x) and i(x) are like a conversion equation in CMP format, and the equations j(x) and k(x) are conversion equations that are additionally implemented for sample refinement after a conversion equation in CMP format is implemented. In other words, an EAV format may be made by applying k(x) to a CMP format, and the EAC format may return to the CMP format by applying j(x), which is an inverse conversion equation of the corresponding equation.

Meanwhile, an EAC format could enhance coding efficiency by refining the inequality of samples but could not solve the problem of a low correlation among sides, which had been shown by the existing CMP format.

FIG. 4 is a view showing a difference between an EAC image and an HEC image according to an embodiment of the present invention.

Referring to FIG. 4, as in a portion indicated by a circle in EAC image, an EAC image may undergo a problem of rapid distortion in a boundary line between sides, which is unique to CMP. In order to solve the problem, HEC(Hybrid Equi-Angular Cube Map) projection format was proposed. As illustrated in the right image of FIG. 4, an HEC format adjusts a size of sample refinement of y-axis (vertical axis) along x-axis (horizontal axis) in each side, thereby modifying the existing EAC format. Through this, the distortion of image samples between sides was made gentler.

HEC project format (or HEC format) is adopted as the default projection format in VVC standardization concerning 360 degree images, since it shows the best compression efficiency in a performance test according to the 360 degree image Common Test Condition (CTC).

FIG. 5 is a view showing a conversion equation of HEC format according to an embodiment of the present invention.

As shown in the example of EAC format described in FIG. 3, h(x) and i(x) are conversion equations in CMP format. In addition, for sample refinement, j(x) and k(x), which are the same as in EAC format, may be applied to a horizontal axis, and l(y) and m(y) may be applied to a vertical axis.

In an encoder for video compression, temporal prediction is utilized based on a high correlation between images with a close time difference. Recently, concerning the next generation video codec standardization, HEC format has been adopted and is being researched to encode 360 degree images. HEC format may enhance coding efficiency better than the existing CMP format by equalizing sample sizes and minimizing distortion between sides within an image. However, a refinement operation performed in an HEC format may generate a distortion for the shape of an object, when the position of the object in an image is changed. The distortion is generated since HEC format differently processes a degree of sample refinement according to position. In other words, when an object in an image does not move, a distortion due to sample refinement is not problematic. On the other hand, when the relative position of the corresponding object in an image is changed, a difference of refinement degree is generated and thus a correlation between images decreases, which is problematic. Particularly, in a motion information estimation that maximally uses information of a neighboring block, such a problem may become more prominent.

FIGS. 6A-6D are views showing a change of motion information due to distortion generated by a sample refinement in an HEC image according to an embodiment of the present invention.

FIG. 6A shows successive images in an HEC format at times t−1 and t respectively. The image at t−1 is an immediately previous image of the image at t. The two images are neighboring in time. The t−1 image may be used as a reference picture in an encoding process of the t image. Here, when an object in the t−1 image moves and the position of the object is changed in the t image, the shapes at t−1 and t may be different in an HEC format. Accordingly, as illustrated in FIG. 6B, different pieces of motion information may appear between neighboring blocks. Ultimately, this may decrease a coding efficiency.

However, a distortion due to the characteristic of a projection format of HEC may be known through a refinement equation. Therefore, additionally refining motion information with a low correlation through a refinement equation before using it may be more advantageous in terms of coding efficiency than using the information as it is. In the present disclosure, a method and apparatus for additionally refining a motion information distortion due to image sample refinement may be provided.

Hereinafter, a method of refining a motion information distortion will be described.

When a 360 degree image is encoded/decoded, image data may be stored in a planar fashion. However, when a 360 degree image is played, it is projected in a stereoscopic space, and a viewer can see a portion of a screen projected in the space. Here, there are various methods of storing 360 degree image data in a planar fashion. The methods may include a distortion of an image for planarizing a stereoscopic structure and enhancing a coding efficiency. A structure of planarizing and storing 360 degree image data is a projection format. Distortion due to a projection format may cause a decrease in the efficiency of a video compression technique. Since a general video compression technique does not consider a distortion due to a projection format, a coding efficiency may decrease in an image where a distortion due to a projection format is present.

FIGS. 7A-7F are views showing a distortion comparison between a CMP image and an HEC image according to an embodiment of the present invention.

FIG. 7A is an example of a 360 degree image stored in an actual CMP format, and FIG. 7B is an example of a 360 degree image stored in an actual HEC format. FIG. 7C expresses a grid of an image in the CMP format, where each region is partitioned into small squares. In a CMP format, when an object is moved in parallel with a screen, no distortion of shape is generated by the movement of the object. A square grid may mean the characteristic. Accordingly, each square grid may maintain its square shape without distortion of shape according to position. FIG. 7E is an enlarged view of a square region indicated in the grid of FIG. 7C. It can be confirmed that the two square grids at different positions do not have different shapes or sizes.

Meanwhile, FIG. 7D is a view obtained by converting the grid image of FIG. 7C into an HEC format. Referring to FIG. 7D, it can be confirmed that a grid in an HEC format is distorted with respect to a grid in a CMP format. The reason why a CMP format is used a criterion is that no distortion of image in a CMP format occurs due to parallel movement with respect to screen. Referring to FIG. 7D, it can be confirmed how HEC conversion distorts a CMP image. For example, each of square grids, which are identical according to the position of an image in a CMP format, has a different shape and size in an HEC format. FIG. 7F is an enlarged view of a square region indicated in the grid of FIG. 7D. It can be confirmed that the shape and/or size of a grid becomes different at different positions. In FIG. 7F, when a shape in the region 0,1 is translated to the region 1,1, the size and form of the shape may become different according to position. Accordingly, in an HEC format, a movement of a shape may generate a distortion thereof at the same time.

Inter-screen prediction technology as one of video compression technologies is a technology of predicting a pixel information of a current block from a reference picture. Here, an inter-screen prediction may express a prediction information by considering a movement of an object in a screen due to a temporal change of a reference picture and a current picture and using motion information. In an inter-screen prediction, motion information may be predicted in order to encode the motion information more efficiently. In other words, predicting motion information may be called a motion information prediction, and the prediction of a motion information utilizes a high probability that motion information is similar between each block. When no distortion is caused by a projection format like in a general two-dimensional image or a CMP image used for a 360 degree image, each motion of objects that have a parallel movement with respect to a screen in the same manner may be expressed by a similar motion information. However, when a distortion is caused by a projection format, even objects with a same motion may have a comparatively large difference in motion information. When there is a large difference in motion information, a coding efficiency of motion information prediction may decrease. Not only in a process of predicting motion information but also in other processes utilizing motion information, a distortion due to a projection format generates a distortion of a motion information, and thus the utilization of a motion information may be inaccurately performed. Herein, a distortion of motion information due to a projection format may be called a motion information distortion. Accordingly, in the present disclosure, a method and/or apparatus for refining a motion information distortion may be provided in order to reduce inaccurate utilization of motion information like a decrease of motion information prediction efficiency caused by a motion information distortion.

FIG. 8 is a view showing a process where the accuracy of a motion information prediction decreases due to a parallel movement in an HEC image according to an embodiment of the present invention.

FIG. 8 is an example showing a change of a grid on a specific side and a distortion of shape, when a CMP image is converted into an HEC image. Referring to FIG. 8, where there are human-like shapes, each of human-like shapes included in a candidate block and a current block respectively may mean a shape in a current picture, and each of human-like shapes included in a reference region of the candidate block and a reference region of the current block respectively may mean a shape in a reference picture. The two shapes are not present in a same picture, and since the two shapes have different temporal positions, they may also exist in different pictures. In FIG. 8, the positions of two shapes mean a spatial positional relationship, and temporal positional relationships may be different from each other. The two shapes are identical but may have a difference in form and/or size due to a distortion of a projection format. The difference may be known through the grid behind the shapes. A current block and a candidate block may be encoded by inter prediction respectively. A candidate block is encoded by referring to a reference region of the candidate block, and motion information used herein is indicated by an arrow starting from the candidate block. A current block is encoded by referring to a reference region of the current block, and motion information used herein is indicated by an arrow starting from the current block. The two shapes moved in parallel with the screen in an actual screen. However, the sizes and/or forms of the shapes changed due to a distortion of a projection format.

Meanwhile, when video encoding and decoding are performed, each block searches for a reference region with the highest coding efficiency, and the reference region may mean a position where a pixel distribution is most similar to each block. Referring to FIG. 8, a region that has the most similar pixel distribution to a candidate block may be a reference region of the candidate block, and a region that has the most similar pixel distribution to a current block may be a reference region of the current block. Motion information is information that is used for encoding a region referred to by each block, and motion information prediction may be used to encode the motion information more efficiently. Motion information prediction may be performed by using the motion information of a neighboring block, and a coding efficiency may be enhanced as the motion information of the neighboring block is more similar to the motion information of a current block.

In FIG. 8, two shapes have an actually same motion in a space, and shapes with a same motion are partitioned in a candidate block and a current block. When there is no distortion of a projection format, a candidate block and a current block may have a same or very similar motion information. However, in the case of FIG. 8, since an HEC format with a projection format distortion is used, it can be confirmed that the motion information of a candidate block and the motion information of a current block are different from each other. In FIG. 8, motion information may distorted by a distortion of a projection format, and it can be known that because of the distortion a difference of motion information is generated between a current block and a candidate block. As a difference of motion information is generated between a current block and a candidate block that is used to predict the current block, the efficiency of motion information prediction may decrease.

Meanwhile, a distortion of motion information may be refined by inverting the generated distortion. Herein, since the distortion is determined by a projection format, refinement may be performed when the projection format is known. When inter-screen prediction is performed, a reference picture has a same projection format distortion as a current picture. Accordingly, when there is no motion between a reference picture and a current picture (that is, the size of a motion is 0), no motion information distortion is generated. However, when a motion occurs between a reference picture and a current picture, a distortion may be generated according to a position of a current block and a size and/or direction of the motion. Accordingly, when a projection format, a position of a current block and a size and/or direction of a motion are known, a distortion may be refined.

When a motion of a current block is estimated through motion information prediction, the motion information that is referred to in a process of motion information prediction is different at a position of a current block and at a position of a block that is referred to. For this reason, the motion information of the current block and the motion information that is referred to may have different distortions. It is because distortions due to a projection format are different at different positions in an image. Motion information without distortion may be estimated by using a position where motion information referred to is generated, motion information and/or a projection format. When there is no distortion, the motion information referred to is more likely to be similar to undistorted motion information of a current block. Accordingly, estimated motion information without distortion may be predicted as undistorted motion information of a current block. By distorting the predicted motion information without distortion of the current block again to match with a distortion of the current block, motion information suitable for the current block may be predicted. Herein, a process of removing a distortion of motion information referred to and a process of distorting the motion information again to make it suitable for a current block may be integrated into a single process.

FIG. 9 is a view showing a process of performing distortion refinement during motion information prediction for a current block according to an embodiment of the present invention.

Referring to FIG. 9, A means a candidate motion vector information (or motion vector) that is referred to by a current block and is expressed by a two-dimensional vector with a starting position a and an indicated position b. In other words, A may mean a motion vector. In addition, the position of a current block is c, and the current picture has an HEC format. Since an HEC format has a projection format distortion, if the motion information of a current block is predicted from A that is not yet refined, a prediction efficiency may decrease. In order to refine the motion A including a distortion, a conversion into a CMP format without projection format distortion may be performed. A', which is A converted into a CMP format, may be obtained by converting a, the starting position of A and b into coordinates in the CMP format. By using $j(x)$ and $l(y)$, which are equations performing a conversion from an HEC format into a CMP format, a' and b' that are positions in the CMP format corresponding to a and b respectively may be obtained. Here, $j(x)$ may mean an equation that converts an x-axis pixel coordinate of an HEC format into an x-axis pixel coordinate of a CMP format, and $l(y)$ may mean an equation that converts a y-axis pixel coordinate of an HEC format into a y-axis pixel coordinate of a CMP format. The motion information A' in a CMP format, which corresponds to the motion information A in an HEC format, is a piece of motion information expressed by a two-dimensional vector with a starting position a' and an indicated position b'.

As there is no motion information distortion in a motion information prediction in a CMP format, motion information at a position in a CMP format corresponding to a current block may be predicted from A'. In a CMP format, a position corresponding to a current block is c'. Accordingly, motion information at c' may be estimated to be A'. c' may be obtained by converting the position c of a current block in an HEC format into a position in a CMP format.

The motion information A' of a current block, which is estimated in a CMP format, needs to be converted again into a corresponding motion information in an HEC format. Here, since c, which is the position of a current block in an HEC format, is different from the position a, even if an estimated motion information of a current block is the same as A', it will not become A when being restored to the HEC format. Accordingly, it needs to be restored to motion information in an HEC format by considering the position of a current block. For example, the position d' referred to by c' may be obtained by using motion information A'. When the corresponding position d in an HEC format for d' is obtained, a predicted motion information B of a current block may be obtained by using a difference from c that is a position of the current block in an HEC format (for example, B=d−c). As B is motion information with refined distortion, it is more likely to be similar to the actual motion information of a current block than motion information with unrefined distortion.

FIG. 10 is a block diagram illustrating a configuration of an encoder to which a motion information distortion refinement is applied, according to an embodiment of the present invention.

FIG. 11 is a block diagram illustrating a configuration of a decoder to which a motion information distortion refinement is applied, according to an embodiment of the present invention.

In FIG. 10 and/or FIG. 11, a motion information distortion refining unit performing motion information distortion refinement is added to an existing encoder/decoder. The motion information distortion refining unit may receive a necessary reference picture sample information (or reference information) from a reconstructed image buffer and transmit motion information, of which the distortion is refined in inter prediction, to an inter prediction unit.

FIG. 12 is a flowchart illustrating an operating method of an encoder/decoder performing a motion information distortion refinement in motion information prediction according to an embodiment of the present invention.

In a step of generating motion information, the motion information of a current block or every kind of motion information that is used to know the motion information of a current block may be input. The motion information means every kind of motion information considered in a motion information prediction process, and for example, there are an AMVP motion candidate, a merge motion candidate, a decoded motion information and the like.

In a step of refining a motion information distortion, a distortion of motion information may be refined. For example, when motion information in the step of generating motion information has a distortion due to a projection format of a current block, the distortion may be refined.

In a step of 'Is it performed for every block?', it may be judged whether or not inter prediction has been performed for every block where inter prediction is performed.

In a step of selecting a next block, a corresponding block may be selected according to a predetermined order or rule in order to perform an encoding or decoding process of a next block. When the corresponding block is encoded or decoded by inter prediction, a step of generating motion information may be performed.

FIGS. 13A-13B are block diagrams illustrating a configuration of an encoder/decoder performing a motion information distortion refinement in motion information prediction according to an embodiment of the present invention.

FIG. 13A is a block diagram illustrating a configuration of an encoder to which a motion information distortion refinement is applied.

A motion information generating unit may generate the motion information of a current block or every kind of motion information that is used to know the motion information of a current block. The motion information means every kind of motion information considered in a process of motion information prediction, and for example, there are an AMVP motion candidate, a merge motion candidate, a decoded motion information and the like. According to a method of generating motion information, the information of a current block or a neighboring block may be used.

A motion information distortion refining unit may refine a distortion of motion information. For example, when motion information generated by a motion information generating unit has a distortion due to a projection format, the distortion may be refined.

A motion information encoding unit may encode information that is used to generate motion information. The information may include motion information with a motion information distortion being refined. The motion information may be coded in a bitstream.

FIG. 13B is a block diagram illustrating a configuration of a decoder to which a motion information distortion refinement is applied.

A motion information decoding unit may decode information, which is used to generate encoded motion information, from a bitstream.

Based information used to generate a decoded motion information, a motion information generating unit may generate the motion information of a current block or every kind of motion information used to know the motion information of a current block. The motion information means every kind of motion information considered in a process of motion information prediction, and for example, there are an AMVP motion candidate, a merge motion candidate, a decoded motion information and the like. According to a method of generating motion information, the information of a current block or a neighboring block may be used.

A motion information distortion refining unit may refine a distortion of motion information. When motion information generated by a motion information generating unit has a distortion due to a projection format, the distortion may be refined.

Based on motion information with distortion being refined, a motion compensating unit may perform a motion compensation of a current block by using an ultimately generated motion information. By performing the motion compensation, a pixel of a current block may be predicted or reconstructed.

Meanwhile, as the case may be, unrefined motion information may be more advantageous to encoding than motion information with a motion information distortion being refined. Alternatively, according to an environment of an encoder/decoder, a motion information distortion refinement may be selectively skipped. For example, when the performance of a motion information distortion refinement is skipped, since a calculation process for using a motion information distortion refinement is skipped, computational complexity may be reduced. In this case, a method of selectively performing a motion information distortion refinement may be applied. Here, whether or not to perform a motion information distortion refinement may be determined according to a predetermined criterion. Hereinafter, an embodiment of criterion for determining whether or not to perform a motion information distortion refinement will be described.

1) Based on a size of motion information, it may be determined whether or not to perform a motion information distortion refinement.

A distortion of motion information due to a projection format tends to increase as the size of the motion information increases. Here, the size of the motion information may mean a motion degree of a shape expressed by the motion information, and it may mean that as a size of motion information is larger, a spatial motion of a shape is greater. For example, by using a predetermined threshold, a motion information distortion refinement may be performed only for the motion information that is larger than the predetermined threshold. Herein, a value that is predefined in an encoder/decoder may be used as the threshold. Alternatively, it may be used by being synchronized through separate signaling.

2) Based on a face position of a current block, it may be determined whether or not to perform a motion information distortion refinement.

A divided side of a picture that is defined in a projection format is a face. The face may mean how each screen region in a 360 degree image will be arranged in a space.

FIG. 14 is a view showing a face division of a picture in a 360 degree image format according to an embodiment of the present invention.

The number of each face may mean a position of each face and a connection relationship in a space. Herein, according to a projection format, each face may have a different degree or characteristic of distortion. Accordingly, different methods of distortion refinement may be performed, or distortion refinement may be skipped according to each face.

3) Based on a characteristic of a block in a face of a current block, it may be determined whether or not to perform a motion information distortion refinement.

According to a position of a block in each face, a degree or characteristic of distortion due to a projection format may be different. In addition, a degree or characteristic of distortion may also be different according to a size or shape of a block. A degree or characteristic of distortion according to a position, size and shape of a block may be applied to both a current block and a block referred to by the current block. Accordingly, a method of refining a motion information distortion and whether or not to perform the method may be determined by using all or some of block characteristics like positions in a face, sizes and shapes of a current block and a reference block.

4) Based on signaling, it may be determined whether or not to perform a motion information distortion refinement.

A decoder may determine whether or not to perform a distortion refinement through a signaled signal, and an encoder may encode a signal and perform signaling by determining whether or not to perform a distortion refinement. For example, using all or some of the methods 1) to 3), an encoder may determine whether or not to perform a distortion refinement. In addition, for the determination, an encoder may directly compare coding efficiencies between using motion information with a distortion being refined and using motion information with an unrefined distortion. The signaling may be performed explicitly or be performed implicitly. As an example of implicit signaling, when a merge list or an AMVP list is configured, both a candidate with a distortion being refined and a candidate with an unrefined distortion may be used, and whether or not a distortion is refined may be inferred by using a merge index or an AMVP index, which is sent in a merge mode or an AMVP mode.

Meanwhile, the methods 1) to 4) may be used individually. Alternatively, two or more methods may be compositely used.

FIG. 15 is a flowchart illustrating an operating method of an encoder/decoder that selectively performs a motion information distortion refinement according to an embodiment of the present invention.

In a step of generating motion information, the motion information of a current block or every kind of motion information that is used to know the motion information of a current block may be generated. The motion information means every kind of motion information considered in a motion information prediction process, and for example, there are an AMVP motion candidate, a merge motion candidate, a decoded motion information and the like.

In a step of 'Is distortion refinement performed?', it may be determined whether or not a motion information distortion refinement is performed.

In a step of refining a motion information distortion, a distortion of motion information may be refined. For example, when motion information generated in a step of generating motion information has a distortion due to a projection format, the distortion may be refined.

In a step of 'Is it performed for every block?', it may be judged whether or not inter prediction has been performed for every block where inter prediction is to be performed.

In a step of selecting a next block, a corresponding block may be selected according to a predetermined order or a predetermined rule in order to perform an encoding or decoding process of a next block. When the corresponding block is encoded or decoded by inter prediction, a step of generating motion information may be performed.

FIGS. 16A-16B are block diagrams illustrating a configuration of an encoder/decoder selectively performing a motion information distortion refinement according to an embodiment of the present invention.

FIG. 16A is a block diagram illustrating a configuration of an encoder to which a method of selectively performing a motion information distortion refinement is applied.

A motion information generating unit may generate the motion information of a current block or every kind of motion information that is used to know the motion information of a current block. The motion information means every kind of motion information considered in a motion information prediction process, and for example, there are an AMVP motion candidate, a merge motion candidate, a decoded motion information and the like. According to a method of generating motion information, the information of a current block or a neighboring block may be used.

A motion information distortion refining unit may refine a distortion of motion information. For example, when motion information generated by a motion information generating unit has a distortion due to a projection format, the distortion may be refined.

A selection unit of whether or not to refine motion information may select motion information to be used for encoding a current block between motion information generated in a motion information generating unit and motion information for which a distortion has been refined in a motion information distortion refining unit, in accordance with a predetermined criterion.

A motion information encoding unit may encode information that is used to generate motion information. The information may include motion information with a motion information distortion being refined. The encoded motion information may be included in a bitstream.

A motion information encoding unit may encode information that is used to generate motion information. The information may include motion information that is selected in a selection unit of whether or not to refine motion information. The encoded motion information may be included in a bitstream.

FIG. 16B is a block diagram illustrating a configuration of a decoder to which a method of selectively performing a motion information distortion refinement is applied.

A motion information decoding unit may decode information, which is used to generate encoded motion information, from a bitstream.

Based on information used to generate decoded motion information, a motion information generating unit may generate the motion information of a current block or every kind of motion information used to know the motion information of a current block. The motion information means every kind of motion information considered in a motion information prediction process, and for example, there are an AMVP motion candidate, a merge motion candidate, decoded motion information and the like. According to a method of generating motion information, the information of a current block or a neighboring block may be used.

A motion information distortion refining unit may refine a distortion of motion information. When motion information generated by a motion information generating unit has a distortion due to a projection format, the distortion may be refined.

A selection unit of whether or not to refine motion information may select motion information to be used for decoding a current block between motion information generated in a motion information generating unit and motion information for which a distortion has been refined in a motion information distortion refining unit, in accordance with a predetermined criterion.

A motion compensating unit may perform a motion compensation of a current block by using motion information that is ultimately selected in a selection unit of whether or not to refine motion information. By performing the motion compensation, a pixel of a current block may be predicted or reconstructed.

Hereinafter, a method of refining a motion information distortion in an AMVP mode will be described.

An AMVP mode may predict the motion information of a current block from a temporal/spatial neighboring candidate block. However, when an intra-picture spatial position of a temporal/spatial neighboring candidate block is different from an intra-picture spatial position of a current block, or when the size of motion information used as a prediction candidate is not 0, motion information may be distorted due to a distortion caused by a projection format, and thus a prediction accuracy may decrease.

FIGS. 17A-17B are views showing a temporal/spatial candidate configuration of a current block according to an embodiment of the present invention.

Referring to FIG. 17A, A1, A2, B0, B1 and B2 may mean spatial candidates of a current block and positions of spatial candidates, and H and C may mean a temporal candidate of a current block and a spatial position of a temporal candidate. The positions of the temporal/spatial candidates are different from each other and may also be different from the position of a current block. Accordingly, a prediction accuracy may be enhanced by refining a motion information distortion caused by a difference of position between each temporal/spatial candidate and a current block.

Here, an actual candidate block existing at the position of each candidate block may be various in size and/or shape. Alternatively, encoding methods may be different from each other.

FIG. 18 is a view showing a reference position of a candidate block and a configuration of an actual candidate block at the reference position according to an embodiment of the present invention.

Referring to FIG. 18, a configuration of an actual candidate block may have a different shape and size. Here, according to a size and shape of a candidate block, an estimation location of motion information of each candidate block may become different. For example, when a starting position of motion information of each candidate block is estimated to be the center of a corresponding candidate block, even if it is referred to at a same candidate position, central positions of candidate blocks may be different from each other. Here, as a block is larger, a distance of motion information between a current block and a candidate block may increase. When a position between the motion information of a candidate block and the motion information of a current block becomes different, a motion information distortion refinement may become different. It is because a motion information distortion refinement uses position information of each block according to a projection format.

Meanwhile, a position of a candidate block may be estimated by using various positions like the center of a candidate block, the upper left position of a candidate block and the lower right position of a candidate block. Alternatively, the position of each candidate block may be estimated from a specific position and a size information of a block. Accordingly, when a motion information distortion refinement is used, a process of estimating a position of a candidate block may be necessary. In this case, position information of a candidate block may be referred to.

For example, when a candidate is encoded by a sub-block unit intra prediction technique, when a position of a candidate block is estimated by using a predefined method but not considering an actual shape and size of a candidate block, and in the like case, a position of a candidate block may be estimated by a predefined method without position information or size information of a candidate block being directly referred to.

For another example, when a predefined method is used, a method of storing a separate information of a candidate block or estimating a position of a candidate block may be skipped. For example, sub-block initial motion information may be replaced by the initial motion information of a candidate block.

Herein, as an example of estimating a position of a candidate block by a predefined method, the motion information of a sub block existing at a candidate block reference position (for example, A1, A2, B0, B1, B2 in FIG. 18) may be referred to, or a candidate block at a candidate block reference position may be assumed to have a same size and shape as a sub block. Alternatively, the reverse may be the case. For example, the motion information of a sub block may be replaced by the motion information of a candidate block.

FIG. 19 is a flowchart illustrating an operating method of an apparatus performing motion information distortion refinement of an AMVP list according to an embodiment of the present invention.

Referring to FIG. 19, after an AMVP list is configured, a distortion refinement for motion information in the configured AMVP list may be performed. AMVP may configure an AMVP list by selecting only some of AMVP candidates. For candidates configured in an AMVP list, a motion information distortion refinement may be performed.

In a step of generating an AMVP list, AMVP candidates may be selected from available AMVP candidates according to a predetermined method and/or a predetermined priority order, and an AMVP list, which is a set of the selected AMVP candidates, may be generated. Each AMVP candidate has motion information and may have additional information for performing a motion information distortion refinement. The additional information may include position information of a candidate and the like.

In a step of refining a motion information distortion of an AMVP list, a motion information distortion refinement may be performed for motion information of an AMVP candidate existing within an AMVP list. For example, a motion information distortion refinement may be performed for all the motion information within an AMVP list and may also be performed only for some motion information. In addition, according to a judgment criterion for whether or not to perform a distortion refinement or according to a priority order of candidates, a motion information distortion refinement may be performed only for some candidates, or a motion information distortion refinement may be performed for all candidates.

In a step of selecting a best candidate, a best reference candidate for encoding/decoding a current block may be selected in an AMVP list with a motion information distortion being refined.

In a step of 'Is it performed for every block?', it may be judged whether or not an AMVP mode has been performed for every block where inter prediction is performed.

In a step of selecting a next block, a corresponding block may be selected according to a predetermined order or a predetermined rule in order to perform an encoding or decoding process of a next block. When the corresponding block is encoded or decoded into an AMVP mode, a step of generating an AMVP list may be performed.

FIG. 20 is a block diagram illustrating a configuration of an apparatus performing motion information distortion refinement of an AMVP list according to an embodiment of the present invention.

Referring to FIG. 20, after an AMVP list is configured, a distortion refinement for motion information within the configured AMVP list may be performed. AMVP may configure an AMVP list by selecting only some of AMVP candidates. For candidates configured in an AMVP list, a motion information distortion refinement may be performed.

An AMVP candidate searching unit may search for candidate motion information available in an AMVP by using a current block and a neighboring block according to a predetermined method.

An AMVP list generating unit may select AMVP candidates from available AMVP candidates according to a predetermined method and/or a predetermined priority order and may generate an AMVP list that is a set of the selected AMVP candidates. Each AMVP candidate has motion information and may have additional information for performing a motion information distortion refinement. The additional information may include position information of a candidate and the like.

An AMVP list motion information distortion refining unit may perform a motion information distortion refinement for motion information of an AMVP candidate existing within an AMVP list. For example, a motion information distortion refinement may be performed for all the motion information within an AMVP list and may also be performed only for some motion information. In addition, according to a judgment criterion for whether or not to perform a distortion refinement or according to a priority order of candidates, a motion information distortion refinement may be performed only for some candidates, or a motion information distortion refinement may be performed for all candidates.

FIG. 21 is a flowchart illustrating an operating method of an apparatus performing motion information distortion refinement for an AMVP candidate according to an embodiment of the present invention. In a step of searching for an AMVP candidate, an available AMVP candidate may be searched for according to a predetermined method and/or a predetermined priority order.

In a step of refining a motion information distortion of an AMVP candidate, a motion information distortion refinement may be performed for motion information of an AMVP candidate, which is searched for in a step of searching for an AMVAP candidate. According to a judgment criterion for whether or not to perform a distortion refinement or according to a priority order of candidates, a motion information distortion refinement may be performed only for some candidates, or a motion information distortion refinement may be performed for all candidates.

In a step of adding an AMVP candidate to an AMVP list, an AMVP motion information with an AMVP candidate motion information distortion being refined may be added to an AMVP list. In addition, it may include a process of determining whether or not to add each AMVP candidate to an AMVP list. Herein, whether or not an AMVP candidate added to an AMVP list has performed a motion information distortion refinement may be included in a judgment criterion of the determining process.

In a step of 'has AMVP list size reached a maximum value?', it may be confirmed whether or not AMVP candidates with a predefined maximum size have been stored in an AMVP list. When AMVP candidates with a predefined maximum size have been added to an AMVP list, the configuration of the AMVP list may be completed.

When AMVP candidates added to an AMVP list do not have a predefined maximum size, a step of 'has search for every candidate ended?' may be performed. The step of 'has search for every candidate ended?' may judge whether or not all the AMVP candidates that can be searched for have been searched for by a predefined method. When all the AMVP candidates have been searched for, the configuration of an AMVP list may be completed. When not all the AMVP candidates are searched for, a next AMVP candidate may be searched for.

In a step of selecting a best candidate, a best reference candidate for encoding a current block may be selected in an AMVP list with a motion information distortion being refined.

In a step of 'Is it performed for every block?', it may be judged whether or not an AMVP mode has been performed for every block where inter prediction is performed.

A step of selecting a next block may select a corresponding block according to a predetermined order or a predetermined rule in order to perform an encoding or decoding process of a next block. When the corresponding block is encoded or decoded into an AMVP mode, a step of searching for an AMVP candidate may be performed.

FIG. 22 is a block diagram illustrating a configuration of an apparatus performing motion information distortion refinement for an AMVP candidate according to an embodiment of the present invention.

An AMVP candidate searching unit may search for candidate motion information available in an AMVP by using a current block and a neighboring block according to a predetermined method. Each AMVP candidate has a motion information and may have additional information for performing a motion information distortion refinement. The additional information may include position information of a candidate and the like.

An AMVP candidate motion information distortion refining unit may perform a motion information distortion refinement for motion information of an AMVP candidate that is searched for in an AMVP candidate searching unit. For example, it may be performed for motion information of all AMVP candidates or only some AMVP candidates. In addition, according to a judgment criterion for whether or not to perform a distortion refinement or according to a priority order of candidates, a motion information distortion refinement may be performed only for some candidates, or a motion information distortion refinement may be performed for all candidates.

An AMVP list generating unit may select AMVP candidates from available AMVP candidates according to a predetermined method and/or a predetermined priority order and may generate an AMVP list that is a set of the selected AMVP candidates. In addition, it may include a process of determining whether or not to add each AMVP candidate to an AMVP list. Herein, whether or not an AMVP candidate added to an AMVP list has performed a motion information distortion refinement may be included in a judgment criterion of the determining process.

FIG. 23 is a flowchart illustrating an operating method of an apparatus using both a general AMVP candidate and an AMVP candidate, for which motion information distortion refinement is performed, as AMVP candidate, according to an embodiment of the present invention.

Each step of FIG. 23 is the same as each step of FIG. 21. However, an AMVP candidate search result may be directly transmitted not only to a step of refining a motion information distortion of an AMVP candidate but also to a step of adding an AMVP candidate to an AMVP list. Accordingly, an AMVP list may include both an AMVP candidate with a motion information distortion being refined and an AMVP candidate with unrefined motion information distortion for a same AMVP candidate and may predict motion information by using the AMVP list. Here, according to whether or not a motion information distortion refinement is performed, a priority order for adding an AMVP candidate to an AMVP list may be changed.

Hereinafter, a method of refining a motion information distortion in a merge mode will be described.

A merge mode may predict motion information of a current block from a temporal/spatial neighboring candidate block. However, when an intra-picture spatial position of a temporal/spatial neighboring candidate block is different from an intra-picture spatial position of a current block, or when the size of motion information used as a prediction candidate is not 0, motion information may be distorted due to a distortion caused by a projection format, and thus a prediction accuracy may decrease.

Referring to FIG. 17 again, A1, A2, B0, B1 and B2 may mean spatial candidates of a current block and positions of spatial candidates, and H and C may mean a temporal candidate of a current block and a spatial position of a temporal candidate. The positions of the temporal/spatial candidates are different from each other and may also be different from the position of a current block. Accordingly, a prediction accuracy may be enhanced by refining a motion information distortion caused by a difference of position between each temporal/spatial candidate and a current block.

Here, an actual candidate block existing at the position of each candidate block may be various in size and/or shape. Alternatively, encoding methods may be different from each other.

Referring to FIG. 18 again, according to a size and shape of a candidate block, an estimation location of motion information of each candidate block may become different. For example, when a starting position of motion information of each candidate block is estimated to be the center of a corresponding candidate block, even if it is referred to at a same candidate position, central positions of candidate blocks may be different from each other. Here, as a block is larger, a distance of motion information between a current block and a candidate block may increase. When a position between motion information of a candidate block and motion information of a current block becomes different, a motion information distortion refinement may become different. It is because a motion information distortion refinement uses position information of each block according to a projection format.

Meanwhile, a position of a candidate block may be estimated by using various positions like the center of a candidate block, the upper left position of a candidate block and the lower right position of a candidate block. Alternatively, the position of each candidate block may be estimated from a specific position and a size information of a block. Accordingly, when a motion information distortion refinement is used, a process of estimating a position of a candidate block may be necessary. In this case, position information of a candidate block may be referred to.

For example, when a candidate block is encoded by a sub-block unit intra prediction technology, when a position of a candidate block is estimated by using a predefined method without considering an actual shape and size of a candidate block, and in the like case, a position of a candidate block may be estimated by a predefined method without position information or size information of a candidate block being directly referred to.

For another example, when a predefined method is used, a method of storing a separate information of a candidate block or estimating a position of a candidate block may be skipped.

Herein, as an example of estimating a position of a candidate block by a predefined method, the motion information of a sub block existing at a candidate block reference position (for example, A1, A2, B0, B1, B2 and other positions in FIG. 18) may be referred to, or a candidate block at a candidate block reference position may be assumed to have a same size and shape as a sub block.

FIG. 24 is a flowchart illustrating an operating method of an apparatus performing motion information distortion refinement of a merge list according to an embodiment of the present invention.

A merge mode may configure a merge list by selecting only some of merge candidates. For candidates configured in a merge list, a motion information distortion refinement may be performed.

In a step of generating a merge list, merge candidates may be selected from available merge candidates according to a predetermined method and/or a predetermined priority order, and a merge list, which is a set of the selected merge candidates, may be generated. Each merge candidate has motion information and may have additional information for performing a motion information distortion refinement. The additional information may include position information of a candidate and the like.

In a step of refining a motion information distortion of a merge list, a motion information distortion refinement may be performed for motion information of a merge candidate existing within a merge list. For example, a motion information distortion refinement may be performed for all the motion information within a merge list and may also be performed only for some motion information. In addition, according to a judgment criterion for whether or not to perform a distortion refinement or according to a priority order of candidates, a motion information distortion refinement may be performed only for some candidates, or a motion information distortion refinement may be performed for all candidates.

In a step of selecting a best candidate, a best reference candidate for encoding/decoding a current block may be selected in a merge list with a motion information distortion being refined.

In a step of 'Is it performed for every block?', it may be judged whether or not a merge mode has been performed for every block where inter prediction is performed.

In a step of selecting a next block, a corresponding block may be selected according to a predetermined order or a predetermined rule in order to perform an encoding or decoding process of a next block. When the corresponding block is encoded or decoded into a merge mode, a step of generating a merge list may be performed.

FIG. 25 is a block diagram illustrating a configuration of an apparatus performing a motion information distortion refinement of a merge list according to an embodiment of the present invention. A merge candidate searching unit may search for candidate motion information available in a merge by using a current block and a neighboring block according to a predetermined method.

A merge list generating unit may select merge candidates from available merge candidates according to a predetermined method and/or a predetermined priority order and may generate a merge list that is a set of the selected merge candidates. Each merge candidate has motion information and may have additional information for performing a motion information distortion refinement. The additional information may include position information of a candidate and the like.

A merge list motion information distortion refining unit may perform a motion information distortion refinement for motion information of a merge candidate existing within a merge list. For example, a motion information distortion refinement may be performed for all the motion information within a merge list and may also be performed only for some motion information. In addition, according to a judgment criterion for whether or not to perform a distortion refinement or according to a priority order of candidates, a motion information distortion refinement may be performed only for some candidates, or a motion information distortion refinement may be performed for all candidates.

FIG. 26 is a flowchart illustrating an operating method of an apparatus performing motion information distortion refinement for a merge candidate according to an embodiment of the present invention.

In a step of searching for a merge candidate, an available merge candidate may be searched for according to a predetermined method and/or a predetermined priority order.

In a step of refining a motion information distortion of a merge candidate, a motion information distortion refinement may be performed for motion information of a merge candidate, which is searched for in a step of searching for a merge candidate. According to a judgment criterion for whether or not to perform a distortion refinement or according to a priority order of candidates, a motion information distortion refinement may be performed only for some candidates, or a motion information distortion refinement may be performed for all candidates.

In a step of adding a merge candidate to a merge list, merge motion information with a merge candidate motion information distortion being refined may be added to a merge list. In addition, a process of determining whether or not to add each merge candidate to a merge list may be included. Herein, whether or not a merge candidate added to a merge list has performed a motion information distortion refinement may be included in a judgment criterion of the determining process.

In a step of 'has a merge list size reached a maximum value?' it may be confirmed whether or not merge candidates with a predefined maximum size have been stored in a merge list. When merge candidates with a predefined maximum size have been added to a merge list, the configuration of the merge list may be completed.

When merge candidates added to a merge list do not have a predefined maximum size, a step of 'has a search for every candidate ended?' may be performed. The step of 'has a search for every candidate ended?' may judge whether or not all the merge candidates that can be searched for have been searched for by a predefined method. When all the merge candidates have been searched for, the configuration of a merge list may be completed. When not all the merge candidates are searched for, a next merge candidate may be searched for.

In a step of selecting a best candidate, a best reference candidate for encoding a current block may be selected in a merge list with a motion information distortion being refined.

In a step of 'Is it performed for every block?', it may be judged whether or not a merge mode has been performed for every block where inter prediction is performed.

A step of selecting a next block may select a corresponding block according to a predetermined order or a predetermined rule in order to perform an encoding or decoding process of a next block. When the corresponding block is encoded or decoded into a merge mode, a step of searching for a merge candidate may be performed.

FIG. 27 is a block diagram illustrating a configuration of an apparatus performing motion information distortion refinement for a merge candidate according to an embodiment of the present invention.

A merge candidate searching unit may search for candidate motion information available in a merge by using a current block and a neighboring block according to a predetermined method. Each merge candidate has motion information and may have additional information for performing a motion information distortion refinement. The additional information may include position information of a candidate and the like.

A merge candidate motion information distortion refining unit may perform a motion information distortion refinement for motion information of a merge candidate that is searched for in a merge candidate searching unit. For example, it may be performed for motion information of all merge candidates or only some thereof. In addition, according to a judgment criterion for whether or not to perform a distortion refinement or according to a priority order of candidates, a motion information distortion refinement may be performed only for some candidates, or a motion information distortion refinement may be performed for all candidates.

A merge list generating unit may select merge candidates from available merge candidates according to a predetermined method and/or a predetermined priority order and may generate a merge list that is a set of the selected merge candidates. In addition, a process of determining whether or not to add each merge candidate to a merge list may be included. Herein, whether or not a merge candidate added to a merge list has performed a motion information distortion refinement may be included in a judgment criterion of the determining process.

FIG. 28 is a flowchart illustrating an operating method of an apparatus using both a general merge candidate and a merge candidate, for which motion information distortion refinement is performed, as merge candidate, according to an embodiment of the present invention.

Each step of FIG. 28 is the same as each step of FIG. 26. However, a merge candidate search result may be directly transmitted not only to a step of refining a merge candidate motion information distortion but also to a step of adding a merge candidate to a merge list. Accordingly, a merge list may include both a merge candidate with a motion information distortion being refined and a merge candidate with unrefined motion information distortion for a same merge candidate, and motion information may be predicted by using the merge list. Here, according to whether or not a motion information distortion refinement is performed, a priority order for adding a merge candidate to a merge list may be changed.

Hereinafter, an embodiment of a syntax element for implementing an image encoding/decoding method and apparatus refining a motion information distortion will be described.

Table 1 is an example where motion information distortion refinement enable signaling is included in an SPS (Sequence Parameter Set) syntax. Here, a motion information distortion refinement enable signal may be a signal determining whether or not to use a motion information distortion refinement.

TABLE 1

| | Descriptor |
|---|---|
| seq_parameter_set_rbsp( ) { | |
|   sps_seq_parameter_set_id | ue(v) |
|   ... | |
|   projection_format_idx | ue(v) |
|   if(projection_format_idx != NON_360_FORMAT | |
|     && projection_format_idx != CMP_FROMAT ) { | |
|     format_distortion_correction_enable_flag | u(1) |
|   } | |
|   ... | |
| } | | projection_format_idx may be a signal indicating what is a projection format of an image. Depending on a kind of projection format of an image, a distortion may be different. When an image is not a 360 degree image or has a CMP format, there is no distortion due to a projection format. Accordingly, since no distortion refinement is performed when there is no distortion due to a projection format, the transmission and reception of the signal format_distortion_correction_enable_flag may be skipped. When only a predefined format is used, the transmission and reception of a signal may be skipped. projection_format_idx may be a signal to distinguish kinds of projection formats in cases like when a projection format is not a 360 degree image, when a projection format is a CMP format or when a projection format is an HEC format.

NON_360_FORMAT may mean a case where a projection format of an image is not a 360 degree image, and CMP_FROMAT may mean a case where a projection format of an image is a CMP format.

format_distortion_correction_enable_flag is a signal determining whether or not to perform a step of refining a distortion due to a projection format and may mean a motion information distortion refinement enable signal. When the signal is true, a step of refining a distortion due to a projection format or a step of refining a motion information distortion may be performed. According to a judgment criterion or a signal transmitted and received in a lower unit of sequence that is a unit where format_distortion_correction_enable_flag is transmitted and received, whether or not to perform a step of refining a distortion due to a projection format may be differently determined in each unit. When the signal is false, in a lower unit of sequence that is a unit where format_distortion_correction_enable_flag is transmitted and received, a step of refining a distortion due to a projection format is not performed, and the transmission and reception of an associated signal may be skipped. When whether to perform the step is defined in advance according to a predefined appointment of an encoder and decoder, the transmission and reception of the signal format_distortion_correction_enable_flag may be skipped.

Table 2 is an example where motion information distortion refinement enable signaling is included in an PPS (Picture Parameter Set) syntax. Here, a motion information distortion refinement enable signal may be a signal determining whether or not to use a motion information distortion refinement.

TABLE 2

|  | Descriptor |
|---|---|
| pic_parameter_set_rbsp( ) { |  |
|   pps_pic_parameter_set_id | ue(v) |
|   pps_seq_parameter_set_id | ue(v) |
|   ... |  |
|   projection_format_idx | ue(v) |
|   if(projection_format_idx != NON_360_FORMAT |  |
|     && projection_format_idx != CMP_FROMAT ) { |  |
|     format_distortion_correction_enable_flag | u(1) |
|   } |  |
|   ... |  |
| } |  | projection_format_idx may be a signal indicating what is a projection format of an image. Depending on a kind of projection format of an image, a distortion may be different. When an image is not a 360 degree image or is in a CMP format, there is no distortion due to a projection format. Accordingly, since no distortion refinement is performed when there is no distortion due to a projection format, the transmission and reception of the signal format_distortion_correction_enable_flag may be skipped. When only a predefined format is used, the transmission and reception of a signal may be skipped.

NON_360_FORMAT may mean a case where a projection format of an image is not a 360 degree image, and CMP_FROMAT may mean a case where a projection format of an image is a CMP format.

format_distortion_correction_enable_flag is a signal determining whether or not to perform a step of refining a distortion due to a projection format and may mean a motion information distortion refinement enable signal. When the signal is true, a step of refining a distortion due to a projection format or a step of refining a motion information distortion may be performed. According to a judgment criterion or a signal transmitted and received in a lower unit of picture that is a unit where format_distortion_correction_enable_flag is transmitted and received, whether or not to perform a step of refining a distortion due to a projection format may be differently determined in each unit. When the signal is false, in a lower unit of picture that is a unit where format_distortion_correction_enable_flag is transmitted and received, a step of refining a distortion due to a projection format is not performed, and the transmission and reception of an associated signal may be skipped. When whether to perform the step is defined in advance according to a predefined appointment of an encoder and decoder, transmission and reception of the signal format_distortion_correction_enable_flag may be skipped.

Table 3 is an example where motion information distortion refinement use signaling is included in a coding unit syntax. It is an example where a signal is signaled indicating whether or not each CU (Coding Unit) perform decoding by using a motion information distortion refinement.

TABLE 3

|  | Descriptor |
|---|---|
| coding_unit( x0, y0, cbWidth, cbHeight ) { |  |
|   if( slice_type != I ) { |  |
|     ... |  |
|   } |  |
|   if( CuPredMode[ x0 ][ y0 ] = = MODE_INTRA ) { |  |
|     ... |  |
|   } else {/* MODE_INTER */ |  |
|     ... |  |
|     if(format_distortion_correction_enable_flag ) { |  |
|       cu_format_distortion_correction_flag | u(1) |
|     } |  |
|     ... |  |
|   } |  |
|   ... |  |
| } |  | cu_format_distortion_correction_flag may be a signal indicating whether or not a current CU performs a motion information distortion refinement. It may be transmitted and received only when a current CU performs inter prediction (MODE_INTER) and format_distortion_correction_enable_flag is true. If cu_format_distortion_correction_flag is true, when a current CU performs inter prediction, a motion information distortion refinement process may be performed. If cu_format_distortion_correction_flag is false, when a current CU performs inter prediction, a motion information distortion refinement process may not be performed. cu_format_distortion_correction_flag may skip the transmission and reception of a signal by performing a motion information distortion refinement according to a method that is predefined in an encoder/decoder.

Table 4 is an example where motion information distortion refinement use signaling is included in a coding unit syntax for each prediction direction. It is an example where a signal indicating whether or not decoding is performed by using a motion information distortion refinement in each CU (Coding Unit) is a signaled. It is an example where inter prediction of CU may be performed as bidirectional prediction. Each CU may perform bidirectional prediction. As an example where whether or not to perform a motion information distortion refinement is differently determined for each direction, a signal indicating whether or not to perform a motion information distortion refinement may be signaled for each direction.

TABLE 4

| | Descriptor |
|---|---|
| coding_unit( x0, y0, cbWidth, CbHeight ) {   if( slice_type != I ) {     ...   }   if( CuPredMode[ x0 ][ y0 ] = = MODE_INTRA ) {     ...   } else {/* MODE_INTER */     ...     if(format_distortion_correction_enable_flag ) {       cu_format_distortion_correction_l0_flag | u(1) |
|       if( slice_type = = B )         cu_format_distortion_correction_l1_flag | u(1) |
|     }     ...   }   ... } | | cu_format_distortion_correction_l0_flag may be a signal indicating whether or not a motion information distortion refinement is performed in L0 direction inter prediction of a current CU. It may be signaled only when a current CU performs inter prediction of L0 direction (PRED_L0) and format_distortion_correction_enable_flag is true. If cu_format_distortion_correction_flag_l0_flag is true, when a current CU performs L0 direction inter prediction, a motion information distortion refinement process may be performed. If cu_format_distortion_correction_flag_l0_flag is false, when a current CU performs L0 direction inter prediction, a motion information distortion refinement process may not be performed. cu_format_distortion_correction_l0_flag may skip the transmission and reception of a signal by performing a motion information distortion refinement according to a method that is predefined in an encoder/decoder.

cu_format_distortion_correction_l1_flag may be a signal indicating whether or not a motion information distortion refinement is performed in L1 direction inter prediction of a current CU. It may be signaled only when a current CU performs inter prediction of L1 direction (PRED_L1) and format_distortion_correction_enable_flag is true. If cu_format_distortion_correction_flag_l1_flag is true, when a current CU performs L1 direction inter prediction, a motion information distortion refinement process may be performed. If cu_format_distortion_correction_flag_l1_flag is false, when a current CU performs L1 direction inter prediction, a motion information distortion refinement process may not be performed. cu_format_distortion_correction_l1_flag may skip the transmission and reception of a signal by performing a motion information distortion refinement according to a method that is predefined in an encoder/decoder.

Table 5 is an example where motion information distortion refinement use signaling is performed only in AMVP in a coding unit syntax, and the signaling is performed for each prediction direction. It is an example where a signal is signaled to indicate whether or not decoding is performed by using a motion information distortion refinement in each CU (Coding Unit) that is encoded/decoded into AMVP mode. It is an example where inter prediction of CU may be performed as bidirectional prediction. Each CU may perform bidirectional prediction. As an example where whether or not to perform a motion information distortion refinement is differently determined for each direction, a signal indicating whether or not to perform a motion information distortion refinement may be signaled for each direction.

TABLE 5

| | Descriptor |
|---|---|
| coding_unit( x0, y0, cbWidth, cbHeight ) {   if( slice_type != I ) {     ...   }   if( CuPredMode[ x0 ][ y0 ] = = MODE_INTRA ) {     ...   } else {/* MODE_INTER */     ...     if( cu_skip_flag[ x0 ][ y0 ] ) {       ...     } else {       merge_flag[ x0 ][ y0 ] | ae(v) |
|       if( merge_flag[ x0 ][ y0 ] ) {         ...       } else {         if( slice_type = = B )           inter_pred_idc[ x0 ][ y0 ] | ae(v) |
|         ...         if ( inter_pred_idc[ x0 ][ y0 ] != PRED_L1 ) {           ...           if(format_distortion_correction_enable_flag ) {             cu_format_distortion_correction_l0_flag | u(1) |
|           }           ...         }         ...         if ( inter_pred_idc[ x0 ][ y0 ] != PRED_L0 ) {           ...           if(format_distortion_correction_enable_flag) {             cu_format_distortion_correction_l1_flag | u(1) |
|           }           ...         }         ...       }     }   }   ... } | | cu_format_distortion_correction_l0_flag may be a signal indicating whether or not a motion information distortion refinement is performed in L0 direction inter prediction of a current CU. It may be signaled only when a current CU performs inter prediction of L0 direction (PRED_L0) and format_distortion_correction_enable_flag is true. If cu_format_distortion_correction_flag_l0_flag is true, when a current CU performs L0 direction inter prediction, a motion information distortion refinement process may be performed. If cu_format_distortion_correction_flag_l0_flag is false, when a current CU performs L0 direction inter prediction, a motion information distortion refinement process may not be performed. cu_format_distortion_correction_l0_flag may skip the transmission and reception of a signal by performing a motion information distortion refinement according to a method that is predefined in an encoder/decoder. cu_format_distortion_correction_l1_flag may be a signal indicating whether or not a motion information distortion refinement is performed in L1 direction inter prediction of a current CU. It may be signaled only when a current CU performs inter prediction of L1 direction (PRED_L1) and format_distortion_correction_enable_flag is true. If cu_format_distortion_correction_flag_l1_flag is true, when a current CU performs L1 direction inter prediction, a motion information distortion process may be performed. If cu_format_distortion_correction_flag_l1_flag is false, when a current CU performs L1 direction inter prediction, a motion information distortion process may not be performed. cu_format_distortion_correction_l1_flag may skip the transmission and reception of a signal by performing a motion information distortion refinement according to a method that is predefined in an encoder/decoder.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method of decoding an image, the method comprising: decoding, from a bitstream, motion vector refinement information indicating enablement of motion vector refinement in a current sequence; determining whether a merge mode is applied to a current block in the current sequence; constructing a merge candidate list of the current block in response to the merge mode being applied to the current block, the merge candidate list comprising at least one of a spatial merge candidate derived from a spatial neighboring block of the current block or a temporal merge candidate derived from a temporal neighboring block of the current block; decoding, from the bitstream, a merge index of the current block; determining a motion vector of the current block based on a merge candidate selected from the merge candidate list based on the merge index; determining whether to refine the motion vector of the current block or not; and refining the motion vector of the current block when it is determined to refine the motion vector, wherein refining the motion vector is performed in response to a size of the current block being greater than a threshold value.

2. The method of claim 1, wherein refining the motion vector of the current block is based on a pixel value in an L0 reference picture of the current block and a pixel value in an L1 reference picture of the current block.

3. The method of claim 1, wherein refining the motion vector of the current block is performed in response to inter prediction being available both for an L0 direction and an L1 direction.

4. The method of claim 1, wherein the refining the motion vector of the current block comprises refining the motion vector of the current block based on projection format conversion information indicating an original projection format and a current projection format.

5. The method of claim 4,
wherein the refining the motion vector of the current block based on projection format conversion information comprises:
generating an intermediate motion vector by refining the motion vector according to projection format conversion from the current projection format to the original projection format based on a position of a neighboring block that is referenced by the current block; and
generating the refined motion vector by refining the intermediate motion vector according to projection format conversion from the original projection format to the current projection format based on a position of the current block.

6. The method of claim 5, wherein the current projection format is an HEC (Hybrid Equi-Angular Cube Map) format and the original projection format is CMP (Cube MaP) format.

7. A method of encoding an image, the method comprising:
constructing a merge candidate list of a current block, the merge candidate list comprising at least one of a spatial merge candidate derived from a spatial neighboring block of the current block or a temporal mere candidate derived from a temporal neighboring block of the current block;

encoding a merge index indicating one of merge candidates included in the merge candidate list;

determining whether to refine a motion vector of the current block, the motion vector being identical to a motion vector of the merge candidate specified indicated by the merge index; and refining the motion vector of the current block when it is determined to refine the motion vector, wherein motion vector refinement information, indicating enablement of motion vector refinement in a current sequence in which the current block is included, is encoded into a bitstream, wherein a merge flag, indicating whether a merge mode is applied to the current block, is encoded into the bitstream, and wherein refining the motion vector is performed in response to a size of the current block being greater than a threshold value.

8. A device for transmitting compressed video data, comprising:

a processor configured to obtain the compressed video data; and a transmitter configured to transmit the compressed video data, wherein obtaining the compressed video data comprises:

constructing a merge candidate list of a current block, the merge candidate list comprising at least one of a spatial merge candidate derived from a spatial neighboring block of the current block or a temporal mere candidate derived from a temporal neighboring block of the current block;

encoding a merge index indicating one of merge candidates included in the merge candidate list;

determining whether to refine a motion vector of the current block, the motion vector being identical to a motion vector of the merge candidate indicated by the merge index; and refining the motion vector of the current block when it is determined to refine the motion vector, wherein motion vector refinement information, indicating enablement of motion vector refinement in a current sequence in which the current block is included, is encoded into the bitstream, wherein a merge flag, indicating whether a merge mode is applied to the current block, is encoded into the bitstream, and wherein refining the motion vector is performed in response to a size of the current block being greater than a threshold value.

* * * * *